(12) United States Patent
Chang et al.

(10) Patent No.: US 12,449,626 B2
(45) Date of Patent: Oct. 21, 2025

(54) OPTICAL LENS MODULE AND ELECTRONIC DEVICE

(71) Applicant: LARGAN PRECISION CO., LTD., Taichung (TW)

(72) Inventors: Ming-Shun Chang, Taichung (TW); Chen Wei Fan, Taichung (TW); Ming-Ta Chou, Taichung (TW); Chun-Hua Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 902 days.

(21) Appl. No.: 17/514,204

(22) Filed: Oct. 29, 2021

(65) Prior Publication Data
US 2023/0045993 A1 Feb. 16, 2023

Related U.S. Application Data

(60) Provisional application No. 63/232,909, filed on Aug. 13, 2021.

(51) Int. Cl.
*G02B 7/02* (2021.01)
*G02B 7/18* (2021.01)
*G02B 13/00* (2006.01)
*G03B 17/17* (2021.01)

(52) U.S. Cl.
CPC ............. *G02B 7/021* (2013.01); *G02B 7/025* (2013.01); *G02B 7/1805* (2013.01); *G02B 13/0065* (2013.01); *G03B 17/17* (2013.01)

(58) Field of Classification Search
CPC ...... G02B 7/021; G02B 7/025; G02B 7/1805; G02B 13/0065; G02B 13/007; G03B 17/17
See application file for complete search history.

(56) References Cited

U.S. PATENT DOCUMENTS

| | | | |
|---|---|---|---|
| 2003/0184669 A1 | 10/2003 | Nishioka et al. | |
| 2006/0109567 A1* | 5/2006 | Chen .................. | G02B 13/0065 359/696 |
| 2015/0215542 A1 | 7/2015 | Nomura et al. | |
| 2015/0237241 A1 | 8/2015 | Wilson et al. | |
| 2018/0203205 A1 | 7/2018 | Cao et al. | |
| 2020/0033566 A1 | 1/2020 | Yao et al. | |

(Continued)

FOREIGN PATENT DOCUMENTS

| CN | 109085688 A | 12/2018 |
|---|---|---|
| CN | 112904529 A | 6/2021 |

(Continued)

OTHER PUBLICATIONS

Machine translation of KR20060114869A retrieved electronically from PE2E Search, Nov. 13, 2024 (Year: 2024).*

(Continued)

*Primary Examiner* — Cara E Rakowski
(74) *Attorney, Agent, or Firm* — Maschoff Brennan

(57) ABSTRACT

The present disclosure provides an optical lens module. By assembling a first lens barrel, an optical folding element and a second lens barrel, the optical lens module can be miniaturized, image quality of the optical lens module in a compact assembly space can be increased, and the size of a light passage opening of a display panel module can be reduced so as to increase consistency of a display area.

37 Claims, 27 Drawing Sheets

(56) References Cited

U.S. PATENT DOCUMENTS

| | | | |
|---|---|---|---|
| 2020/0319432 A1 | 10/2020 | Choi et al. | |
| 2021/0072515 A1 | 3/2021 | Chang et al. | |
| 2021/0096323 A1* | 4/2021 | Wang | G02B 5/12 |
| 2022/0066182 A1* | 3/2022 | Bueler | G02B 3/14 |
| 2022/0357567 A1* | 11/2022 | Zhao | G02B 23/08 |
| 2023/0350159 A1* | 11/2023 | Wang | G02B 13/0065 |

FOREIGN PATENT DOCUMENTS

| | | | |
|---|---|---|---|
| KR | 20060114869 A * | 11/2006 | |
| TW | 201715270 A | 5/2017 | |
| TW | 201723562 A | 7/2017 | |
| TW | I687730 B | 3/2020 | |
| TW | I704387 B | 9/2020 | |
| TW | 202109115 A | 3/2021 | |
| TW | 202111380 A | 3/2021 | |
| TW | 202119076 A | 5/2021 | |

OTHER PUBLICATIONS

European Search Report in Application No. 21210743.7 Dated May 4, 2022.

* cited by examiner

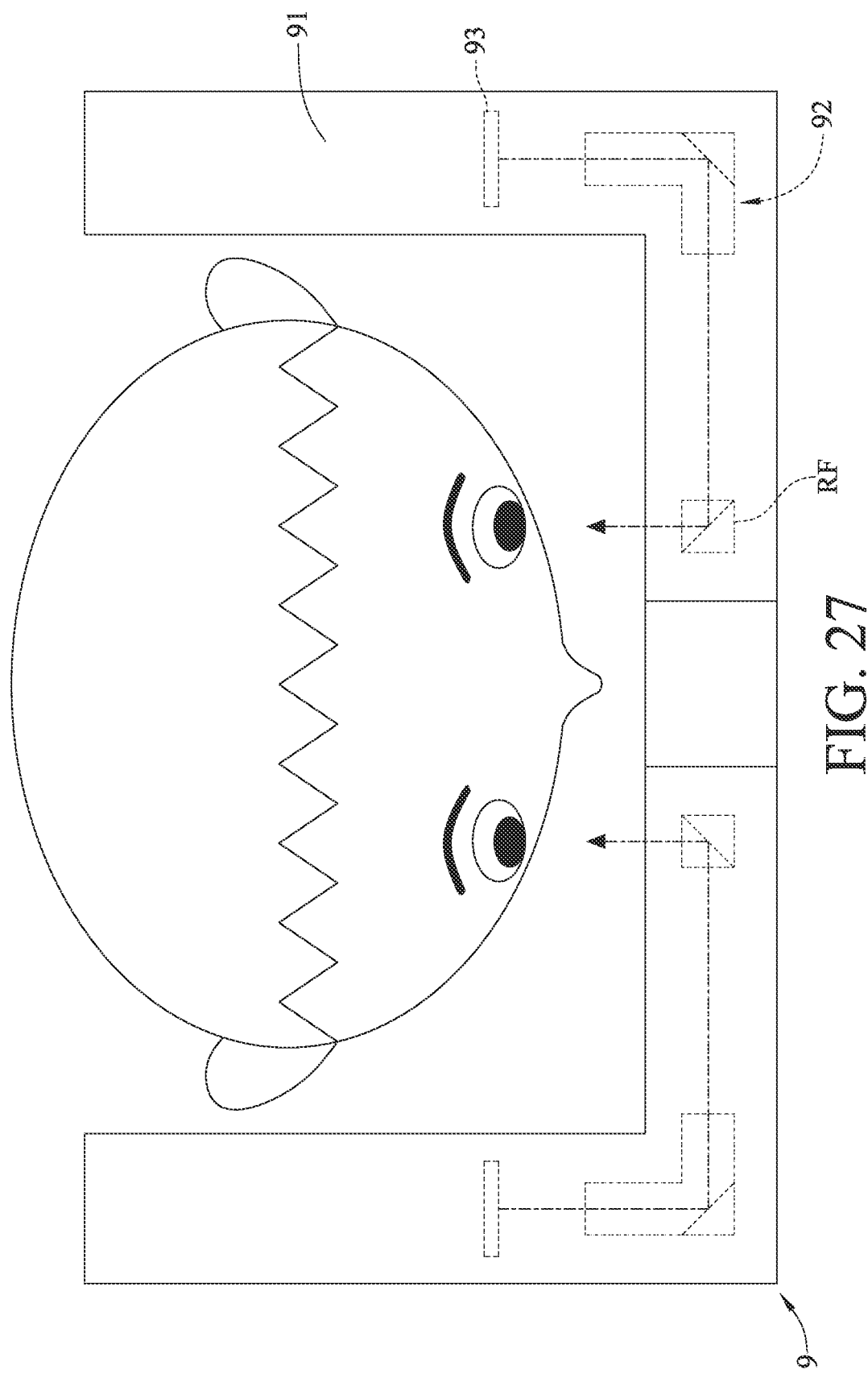

OPTICAL LENS MODULE AND ELECTRONIC DEVICE

RELATED APPLICATIONS

This application claims priority to U.S. Provisional Application 63/232,909, filed on Aug. 13, 2021, which is incorporated by reference herein in its entirety.

BACKGROUND

Technical Field

The present disclosure relates to an optical lens module and an electronic device, more particularly to an optical lens module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, the mobile phone trends to be high screen-to-body ratio or even to be full screen displaying, and therefore a smartphone with a circular punch hole or a notch at the top center of the screen has been developed in the markets. In order to have more consistency of the display area, the opening for the front camera must be as small as possible. However, the size reduction of the opening may cause decrease in imaging quality. Therefore, how to reduce the aperture diameter of the opening in the display area to meet the requirement of high-end-specification electronic devices while maintaining high imaging quality has become an important topic in this field nowadays.

SUMMARY

According to one aspect of the present disclosure, an optical lens module includes a first lens barrel, a first lens assembly, an optical folding element, a second lens barrel and a second lens assembly. The first lens assembly is fixed in the first lens barrel, and the first lens assembly has a first optical axis and includes at least one lens element. The second lens assembly is fixed in the second lens barrel, and the second lens assembly has a second optical axis and includes at least one lens element. A light ray sequentially passes through the first lens assembly, the optical folding element and the second lens assembly. The optical folding element has a reflection surface, such that the light ray is reflected into the second lens assembly after passing through the first lens assembly, and the first optical axis and the second optical axis intersect on the reflection surface. At least one of the first lens barrel and the optical folding element is fixed to the second lens barrel. When an angle between the first optical axis and the second optical axis is $\theta$, the following condition is satisfied: 70 [deg.]$\leq\theta\leq$110 [deg.].

According to another aspect of the present disclosure, an optical lens module includes a first lens barrel, a first lens assembly, an optical folding element, a second lens barrel and a second lens assembly. The first lens assembly is fixed in the first lens barrel, and the first lens assembly has a first optical axis and includes at least one lens element. The second lens assembly is fixed in the second lens barrel, and the second lens assembly has a second optical axis and includes at least one lens element. A light ray sequentially passes through the first lens assembly, the optical folding element and the second lens assembly. The optical folding element has a reflection surface, such that the light ray is reflected into the second lens assembly after passing through the first lens assembly, and the first optical axis and the second optical axis intersect on the reflection surface. At least one of the first lens barrel and the optical folding element is fixed to the second lens barrel. The first lens barrel has at least one first trimmed portion which is reduced from an outer surface of the first lens barrel towards the first optical axis, such that a contour of the first lens barrel viewed along the first optical axis is non-circular. The second lens barrel has a light inlet and a light outlet. The light inlet has a first central axis, and the light outlet has a second central axis. When an angle between the first central axis and the second central axis is $\alpha$, the following condition is satisfied: 55 [deg.]$\leq\alpha\leq$180 [deg.].

According to another aspect of the present disclosure, an optical lens module includes a first lens barrel, a first lens assembly, an optical folding element, a second lens barrel and a second lens assembly. The first lens assembly is fixed in the first lens barrel, and the first lens assembly has a first optical axis and includes at least one lens element. The second lens assembly is fixed in the second lens barrel, and the second lens assembly has a second optical axis and includes at least one lens element. A light ray sequentially passes through the first lens assembly, the optical folding element and the second lens assembly. The optical folding element has a reflection surface, such that the light ray is reflected into the second lens assembly after passing through the first lens assembly, and the first optical axis and the second optical axis intersect on the reflection surface. At least one of the second lens barrel and the optical folding element is fixed to the first lens barrel. The first lens barrel has at least one first trimmed portion which is reduced from an outer surface of the first lens barrel towards the first optical axis, such that a contour of the first lens barrel viewed along the first optical axis is non-circular. The first lens barrel has a light inlet and a light outlet. The light inlet has a first central axis, and the light outlet has a second central axis. When an angle between the first central axis and the second central axis is $\beta$, the following condition is satisfied: 55 [deg.]$\leq\beta\leq$180 [deg.].

According to another aspect of the present disclosure, an electronic device includes one of the aforementioned optical lens modules and a display panel module.

BRIEF DESCRIPTION OF THE DRAWINGS

The disclosure can be better understood by reading the following detailed description of the embodiments, with reference made to the accompanying drawings as follows:

FIG. 27 is a schematic view showing the application scenario of the electronic device in FIG. 24 or FIG. 26.

DETAILED DESCRIPTION

Figure 1:
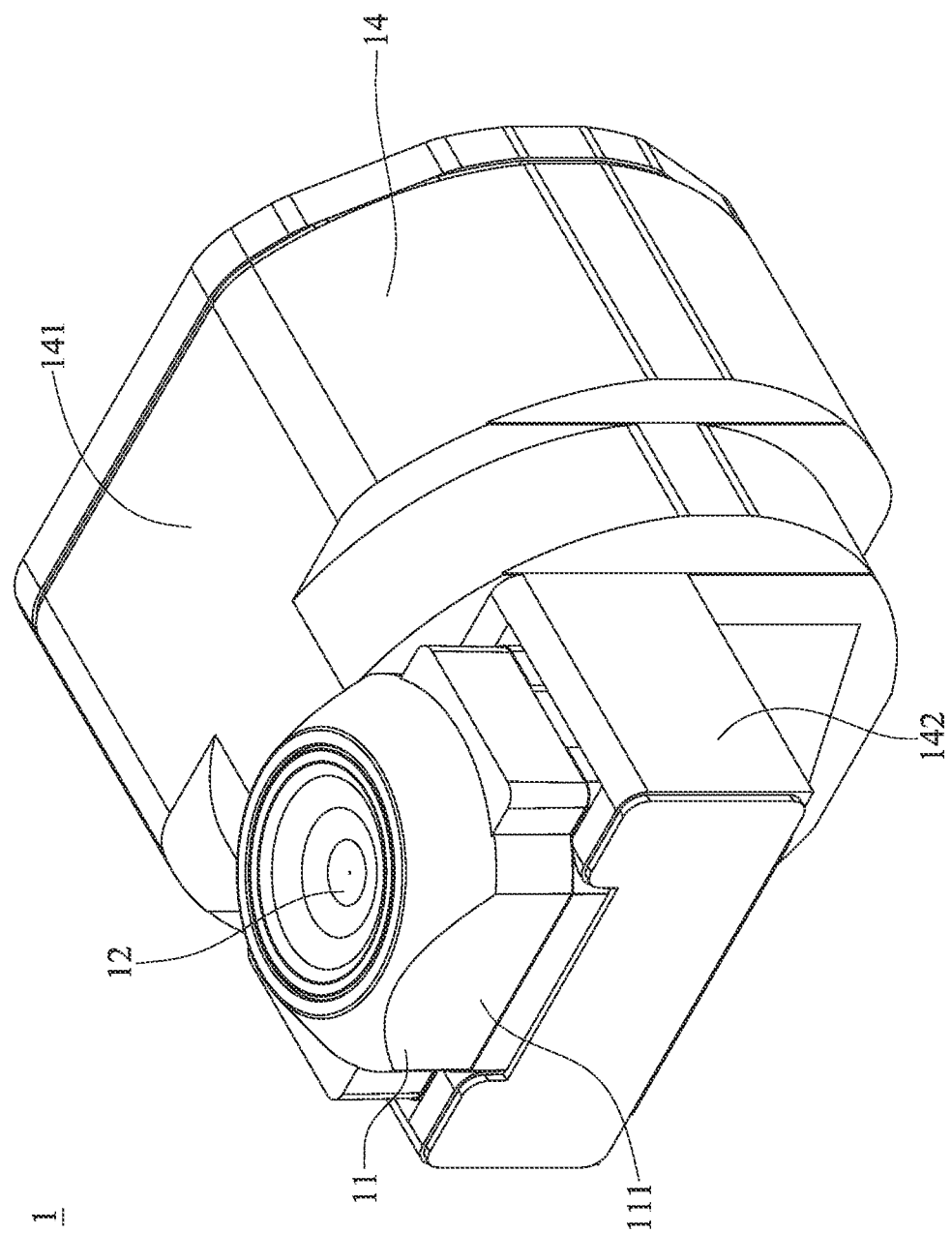
FIG. 1 is a perspective view of an optical lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an optical lens module which can be used as an imaging lens module or a projecting lens module. The optical lens module includes a first lens barrel, a first lens assembly, an optical folding element, a second lens barrel, and a second lens assembly. The first lens assembly is fixed in the first lens barrel, and the first lens assembly has a first optical axis and includes at least one lens element. The optical folding element can be, for example, a prism and has an incident surface and an emitting surface. The incident surface and the emitting surface can be flat surfaces or curved surfaces, but the present disclosure is not limited thereto.

The second lens assembly is fixed in the second lens barrel, and the second lens assembly has a second optical axis and includes at least one lens element.

A light ray sequentially passes through the first lens assembly, the optical folding element and the second lens assembly. Moreover, the optical folding element has a reflection surface, such that the light ray is reflected into the second lens assembly after passing through the first lens assembly. Moreover, the first optical axis and the second optical axis intersect on the reflection surface. Therefore, it is favorable for arranging an optical lens with a folded optical path in a compact installation space so as to increase design flexibility and image quality. Moreover, pointing directions of the first optical axis and the second optical axis can be defined as directions from the reflection surface towards outside of the optical lens module.

The first lens barrel can have at least one first trimmed portion which is reduced from an outer surface of the first lens barrel towards the first optical axis, such that a contour of the first lens barrel viewed along the first optical axis is non-circular. Therefore, it is favorable for reducing the size of the first lens barrel, allowing the first lens barrel to be installed even in a limited space, and it is also favorable for reducing the aperture diameter of the light passage opening; furthermore, it is favorable for maintaining the display area of the electronic device at relatively high consistency so as to obtain a relatively high screen-to-body ratio. Moreover, the first lens assembly can include at least one non-circular lens element for adapting the non-circular first lens barrel. Therefore, it is favorable for miniaturizing the optical lens module.

The second lens barrel can have at least one second trimmed portion which is reduced from an outer surface of the second lens barrel towards the second optical axis, such that a contour of the second lens barrel viewed along the second optical axis is non-circular. Therefore, it is favorable for installing the second lens barrel even in a limited space, and it is also favorable for increasing imaging quality of the optical lens module through the second lens assembly. Moreover, the second lens assembly can include at least one non-circular lens element for adapting the non-circular second lens barrel. Therefore, it is favorable for reducing the total height of the optical lens module.

Note that the term of "fixed" in this specification refers to restricted relative movement between two components. The fixing means can be dispensing adhesive, engagement, etc., and the present disclosure is not limited thereto. Moreover, at least one of the first lens barrel and the optical folding element can be fixed to the second lens barrel. Therefore, it is favorable for reducing the quantity of components so as to simplify assembly processes. Moreover, at least one of the second lens barrel and the optical folding element can be fixed to the first lens barrel. Moreover, the optical folding element can be fixed to each of the first lens barrel and the second lens barrel, with no assembly relationship between the first lens barrel and the second lens barrel. Therefore, it is favorable for connecting the first lens barrel and the second lens barrel via the optical folding element. Specifically, there is no direct assembly relationship between the first lens barrel and the second lens barrel. Please refer to FIG. 15, which shows the first lens barrel 31 and the second lens barrel 34 with no direct assembly relationship therebetween. Moreover, the second lens barrel can be fixed to both of the first lens barrel and the optical folding element. Therefore, it is favorable for increasing assembly reliability so as to enhance impact resistance of the optical lens module. Please refer to FIG. 4 and FIG. 12, which respectively show the second lens barrels 14 and 24 fixed to both of the first lens barrels 11 and 21 and optical folding elements 13 and 23 according to the 1st and 2nd embodiments of the present disclosure. Please refer to FIG. 18, which shows the first lens barrel 41 fixed to both of the second lens barrel 44 and the optical folding element 43 according to the 4th embodiment of the present disclosure.

The first lens barrel can further have a bent portion which is in physical contact with at least one surface of the optical folding element. Therefore, it is favorable for increasing assembly reliability of the optical folding element and assembly efficiency of the optical lens module. Please refer to FIG. 17, which shows bent portion 412 of the first lens barrel 41 according to the 4th embodiment of the present disclosure.

The second lens barrel can further have a bent portion which is in physical contact with at least one surface of the optical folding element. Therefore, it is favorable for increasing assembly reliability of the optical folding element and assembly efficiency of the optical lens module. Please refer to FIG. 7, FIG. 11 and FIG. 20, which respectively show bent portions 142, 242 and 542 of the second lens barrels 14, 24 and 54 according to the 1st, 2nd and 5th embodiments of the present disclosure.

At least one of the first lens barrel and the second lens barrel can further have an adhesive receiving structure. Therefore, it is favorable for restricting relative movement of components by a bonding force therebetween provided due to cured adhesive so as to achieve fixing function, and it is also favorable for dispensing adhesive to fix lens barrels after the lens barrels are aligned so as to optimize imaging quality. Please refer to FIG. 2 and FIG. 14, which respectively show the adhesive receiving structures 143 and 343 according to the 1st and 3rd embodiments of the present disclosure. Moreover, the adhesive receiving structure can be disposed on the bent portion of the first lens barrel or the second lens barrel, such that the bent portion can be fixed to the first lens barrel or the second lens barrel via the adhesive receiving structure.

At least one of the first lens barrel and the second lens barrel can have an alignment structure. Therefore, it is favorable for processing position and assembly by engaging the alignment structure so as to increase assembly efficiency, but the present disclosure is not limited thereto. Please refer to FIG. 11 and FIG. 17, which respectively show the alignment structures 244 and 444 according to the 2nd and 4th embodiments of the present disclosure. Moreover, the alignment structure can be disposed on the bent portion of the first lens barrel or the second lens barrel, such that the bent portion can be fixed to the first lens barrel or the second lens barrel via the alignment structure.

When an angle between the first optical axis and the second optical axis is $\theta$, the following condition can be satisfied: 70 [deg.]$\leq\theta\leq$110 [deg.]. Therefore, it is favorable for reducing the total height of the optical lens module, thereby facilitating thinness and lightness design of the electronic device. Note that $\theta$ can be defined as an angle from the second optical axis counterclockwise towards the first optical axis. Please refer to FIG. 4, which shows $\theta$ according to the 1st embodiment of the present disclosure.

The second lens barrel can have a light inlet and a light outlet. The light inlet has a first central axis, and the light outlet has a second central axis. The first central axis can be defined having a direction from the geometric center of the light inlet towards outside of the second lens barrel, and the second central axis can be defined having a direction from the geometric center of the light outlet towards outside of the second lens barrel. In specific, when the optical lens module is an imaging lens module, a pointing direction of the first central axis can be defined as a direction from the geometric center of the light inlet towards the optical divergence side of the second lens barrel, a pointing direction the second central axis can be defined as a direction from the geometric center of the light outlet towards the optical convergence side of the second lens barrel, and the conjugation surface at the optical convergence side is an image surface; when the optical lens module is a projecting lens module, a pointing direction of the first central axis can be defined as a direction from the geometric center of the light inlet towards the optical convergence side of the second lens barrel, a pointing direction of the second central axis can be defined as a direction from the geometric center of the light outlet towards the optical divergence side of the second lens barrel, and the conjugation surface at the optical convergence side is an image source which can be provided by a display panel. When an angle between the first central axis and the second central axis is $\alpha$, the following condition can be satisfied: 55 [deg.]$\leq\alpha\leq$180 [deg.]. Therefore, it is favorable for reducing the total height of the optical lens module, thereby facilitating reduction in the thickness of the electronic device. Moreover, the following condition can also be satisfied: 79 [deg.]$\leq\alpha\leq$159 [deg.]. Note that $\alpha$ can be defined as an angle from the second central axis counterclockwise towards the first central axis, wherein the first central axis and the second central axis can be non-parallel. Moreover, the light inlet or the light outlet of the second lens barrel can be defined by the bent portion. Please refer to FIG. 9, which shows $\alpha$ according to the 1st embodiment of the present disclosure.

The first lens barrel can have a light inlet and a light outlet. The light inlet has a third central axis, and the light outlet has a fourth central axis. The third central axis can be defined having a direction from the geometric center of the light inlet towards outside of the first lens barrel, and the fourth central axis can be defined having a direction from the geometric center of the light outlet towards outside of the first lens barrel. In specific, when the optical lens module is an imaging lens module, a pointing direction of the third central axis can be defined as a direction from the geometric center of the light inlet towards the optical divergence side of the first lens barrel, a pointing direction of the fourth central axis can be defined as a direction from the geometric center of the light outlet towards the optical convergence side of the first lens barrel, and the conjugation surface at the optical convergence side is an image surface; when the optical lens module is a projecting lens module, a pointing direction of the third central axis can be defined as a direction from the geometric center of the light inlet towards the optical convergence side of the first lens barrel, a pointing direction of the fourth central axis can be defined as a direction from the geometric center of the light outlet towards the optical divergence side of the first lens barrel, and the conjugation surface at the optical convergence side is an image source which can be provided by a display panel. When an angle between the third central axis and the fourth central axis is $\beta$, the following condition can be satisfied: 55 [deg.]$\leq\beta\leq$180 [deg.]. Therefore, it is favorable for reducing the total height of the optical lens module, thereby facilitating reduction in the thickness of the electronic device. Moreover, the following condition can also be satisfied: 79 [deg.]$\leq\beta\leq$159 [deg.]. Note that $\beta$ can be defined as an angle from the fourth central axis counterclockwise towards the third central axis, wherein the third central axis and the fourth central axis can be non-parallel. Moreover, the light inlet or the light outlet of the first lens barrel can be defined by the bent portion. Please refer to FIG. 19, which shows β according to the 4th embodiment of the present disclosure.

When a shortest distance of an outer contour of the first lens barrel in a direction perpendicular to the first optical axis is D1, the following condition can be satisfied: 0.74 [mm]≤D1≤7.2 [mm]. Therefore, it is favorable for miniaturizing the optical lens module. Moreover, the following condition can also be satisfied: 1.2 [mm]≤D1≤4.1 [mm]. Please refer to FIG. 4, which shows D1 according to the 1st embodiment of the present disclosure.

When a shortest distance of an outer contour of the second lens barrel in a direction perpendicular to the second optical axis is D2, the following condition can be satisfied: 3.1 [mm]≤D2≤9.5 [mm]. Therefore, it is favorable for miniaturizing the optical lens module. Please refer to FIG. 4, which shows D2 according to the 1st embodiment of the present disclosure.

When the shortest distance of the outer contour of the first lens barrel in the direction perpendicular to the first optical axis is D1, and the shortest distance of the outer contour of the second lens barrel in the direction perpendicular to the second optical axis is D2, the following condition can be satisfied: D1<D2. Therefore, it is favorable for reducing the thickness of the electronic device.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
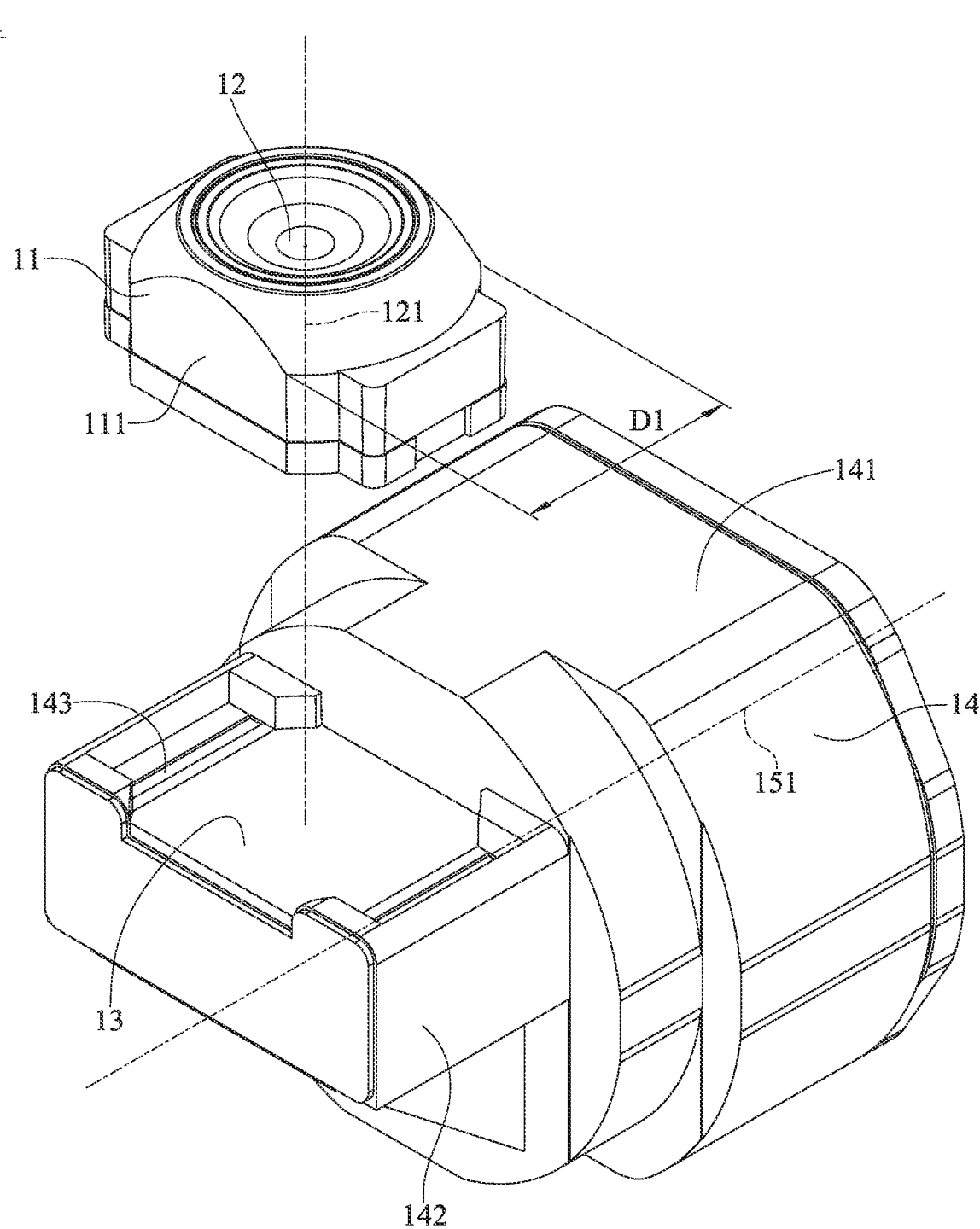
FIG. 2 is a partially exploded view of the optical lens module in FIG. 1.
Figure 3:
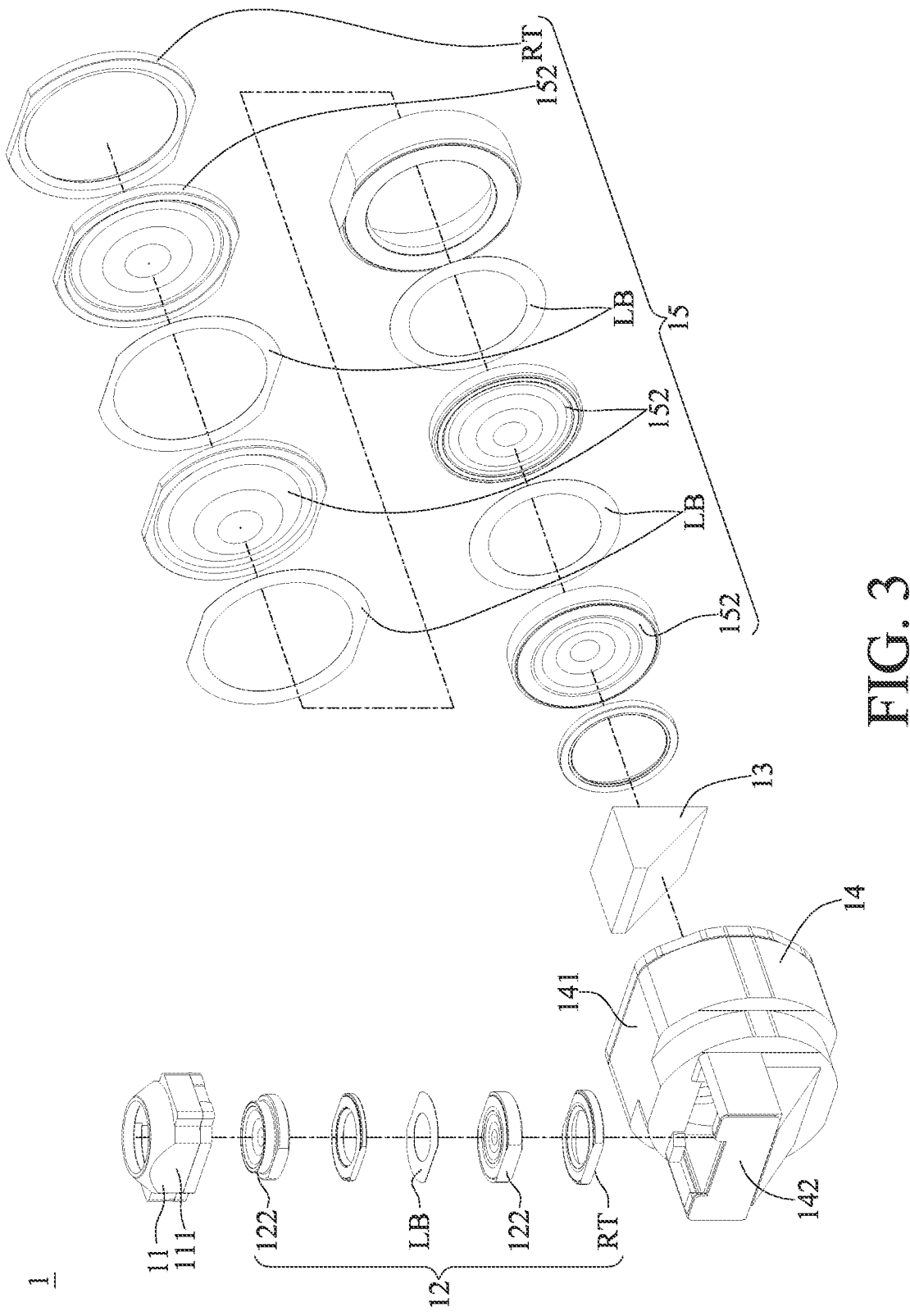
FIG. 3 is an exploded view of the optical lens module in FIG. 1.
Figure 4:
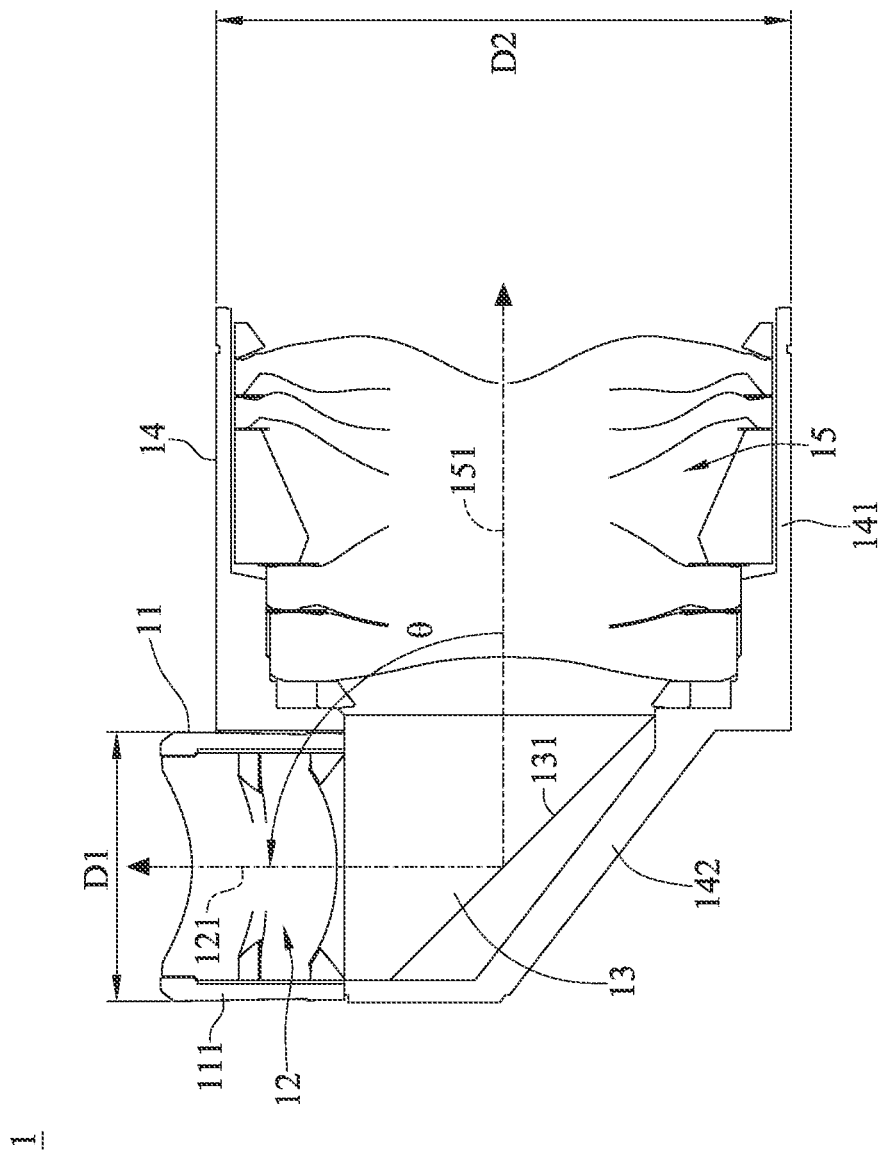
FIG. 4 is a cross-sectional view of the optical lens module in FIG. 1.
Figure 5:
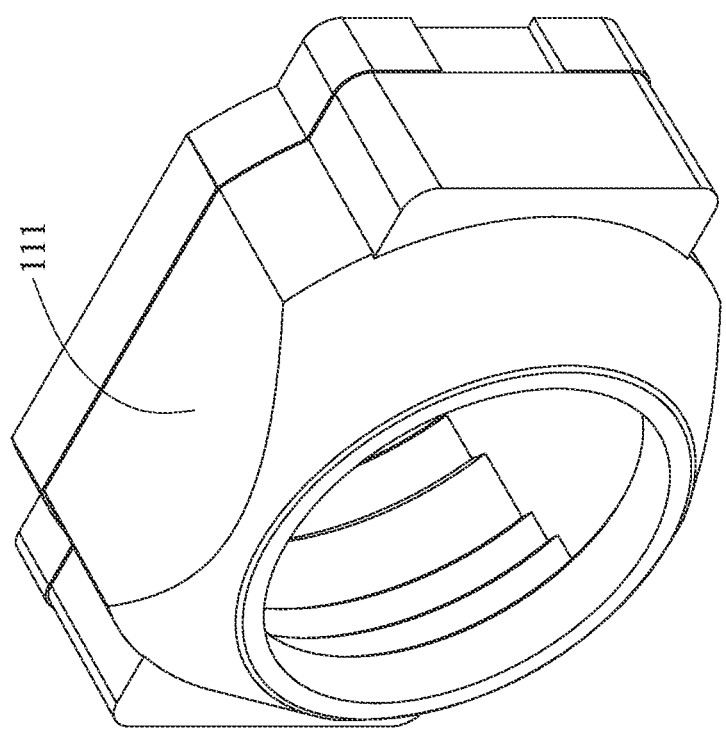
FIG. 5 is a perspective view of a first lens barrel of the optical lens module in FIG. 1.
Figure 6:
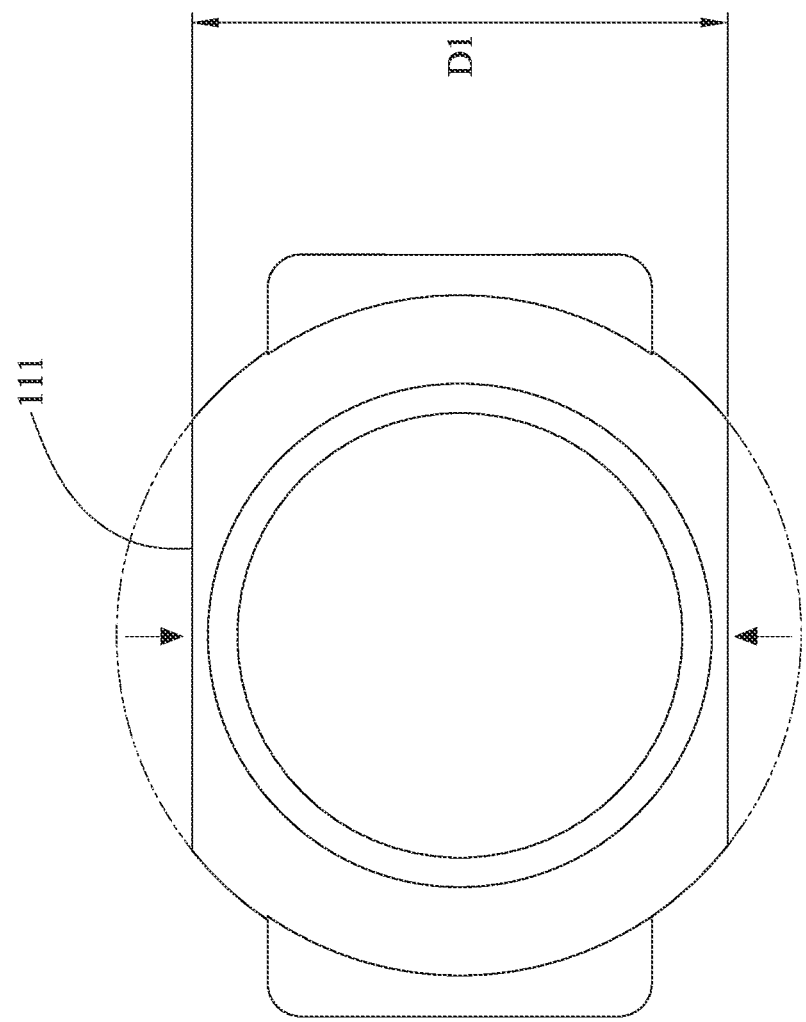
FIG. 6 is a top view of the first lens barrel in FIG. 5.
Figure 7:
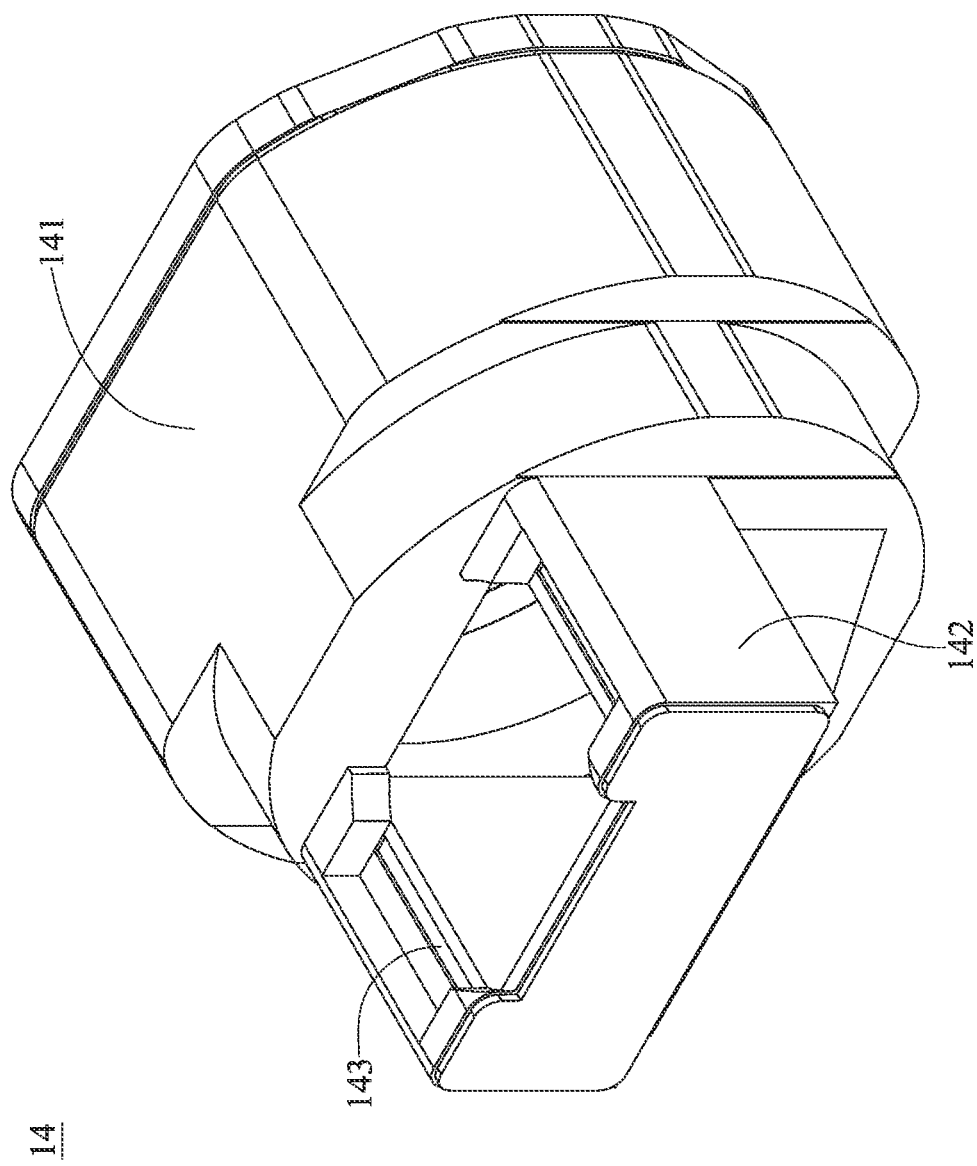
FIG. 7 is a perspective view of a second lens barrel of the optical lens module in FIG. 1.
Figure 8:
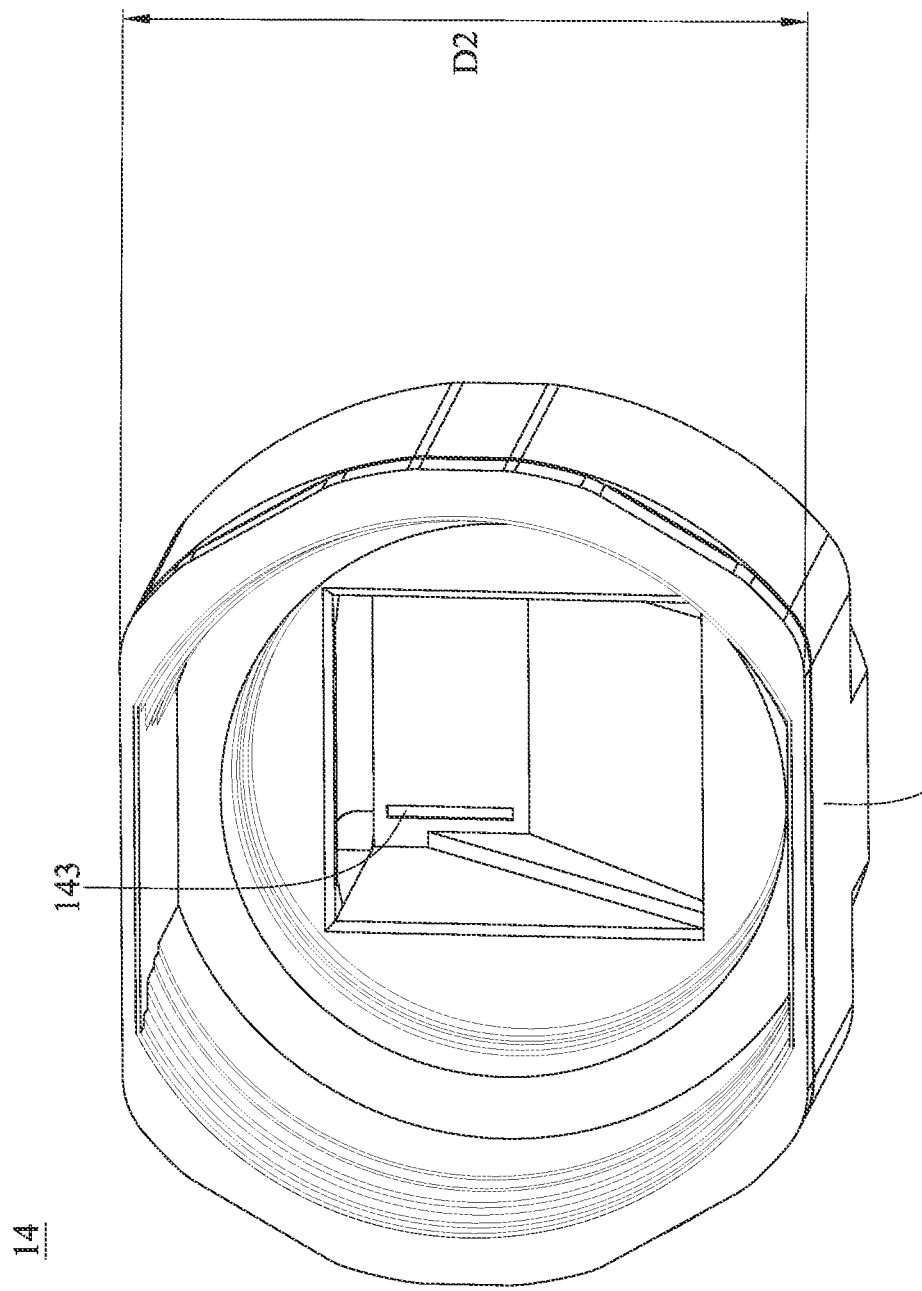
FIG. 8 is another perspective view of the second lens barrel in FIG. 7.
Figure 9:
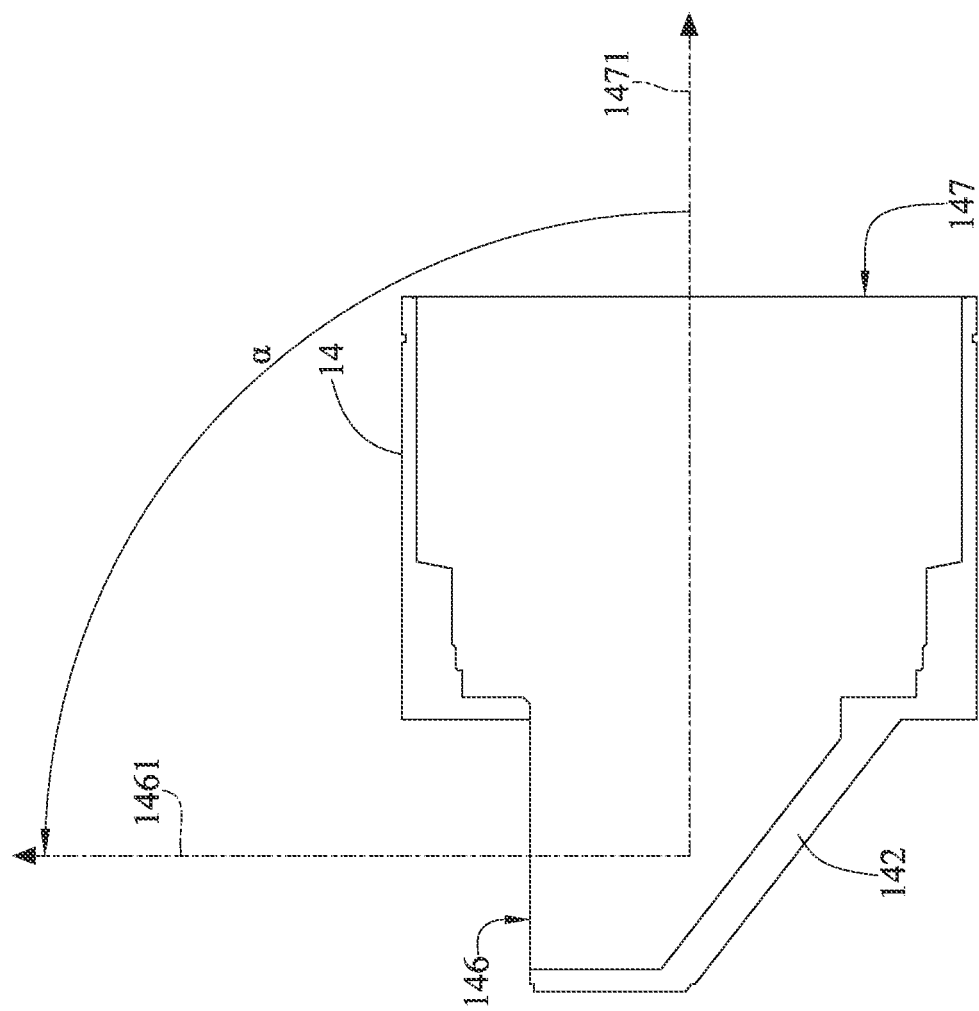
FIG. 9 is a cross-sectional view of the second lens barrel in FIG. 7.

Please refer to FIG. 1 to FIG. 9, where FIG. 1 is a perspective view of an optical lens module according to the 1st embodiment of the present disclosure, FIG. 2 is a partially exploded view of the optical lens module in FIG. 1, FIG. 3 is an exploded view of the optical lens module in FIG. 1, FIG. 4 is a cross-sectional view of the optical lens module in FIG. 1, FIG. 5 is a perspective view of a first lens barrel of the optical lens module in FIG. 1, FIG. 6 is a top view of the first lens barrel in FIG. 5, FIG. 7 is a perspective view of a second lens barrel of the optical lens module in FIG. 1, FIG. 8 is another perspective view of the second lens barrel in FIG. 7, and FIG. 9 is a cross-sectional view of the second lens barrel in FIG. 7.

In this embodiment, an optical lens module 1 includes a first lens barrel 11, a first lens assembly 12, an optical folding element 13, a second lens barrel 14 and a second lens assembly 15.

The first lens assembly 12 is fixed in the first lens barrel 11. The first lens assembly 12 has a first optical axis 121 and includes a plurality of lens elements 122, a light-blocking component LB and a retainer RT.

The second lens assembly 15 is fixed in the second lens barrel 14. The second lens assembly 15 has a second optical axis 151 and includes a plurality of lens elements 152, a plurality of light-blocking components LB and a retainer RT. Note that only part of the contours of the lens elements 122 and the lens elements 152 are shown in the drawings for simplicity, and the contours of the lens elements 122 and the lens elements 152 are not intended to restrict the present disclosure.

A light ray sequentially passes through the first lens assembly 12, the optical folding element 13 and the second lens assembly 15. Specifically, the optical folding element 13 has a reflection surface 131, and the first optical axis 121 and the second optical axis 151 intersect on the reflection surface 131, such that light ray is reflected into the second lens assembly 15 after passing through the first lens assembly 12.

The first lens barrel 11 has two first trimmed portions 111. As shown in FIG. 6, each of the first trimmed portions 111 is reduced from an outer surface of the first lens barrel 11 towards the first optical axis 121, such that a contour of the first lens barrel 11 viewed along the first optical axis 121 is non-circular. Note that the lens elements 122, the light-blocking component LB and the retainer RT of the first lens assembly 12 are non-circular for adapting the non-circular first lens barrel 11.

The second lens barrel 14 has two second trimmed portions 141. Each of the second trimmed portions 141 is reduced from an outer surface of the second lens barrel 14 towards the second optical axis 151, such that a contour of the second lens barrel 14 viewed along the second optical axis 151 is non-circular. Note that some of the lens elements 152, some of the light-blocking components LB and the retainer RT of the second lens assembly 15 are non-circular for adapting the non-circular second lens barrel 14.

The second lens barrel 14 is fixed to both of the first lens barrel 11 and the optical folding element 13. Specifically, the second lens barrel 14 further has a bent portion 142 which is in physical contact with at least one surface of the optical folding element 13 so as to increase assembly reliability of the optical folding element 13 and assembly efficiency of the optical lens module 1. Also, the second lens barrel 14 further has an adhesive receiving structure 143 which is disposed on the bent portion 142, such that the bent portion 142 is fixed to the first lens barrel 11 aligned with the second lens barrel 14 via the adhesive receiving structure 143 on which adhesive is dispensed to be cured to provide a bonding force for assembling the first lens barrel 11 and the second lens barrel 14. Also, the optical folding element 13 is also fixed to the bent portion 142 via the adhesive receiving structure 143, as shown in FIG. 8. However, the present disclosure is not limited thereto. In some other embodiments, the bent portion may be included by the first lens barrel, and the adhesive receiving structure is disposed on the bent portion of the first lens barrel.

When an angle between the first optical axis 121 and the second optical axis 151 is θ, the following condition is satisfied: θ=90 [deg.].

The second lens barrel 14 further has a light inlet 146 and a light outlet 147. The light inlet 146 is defined by the bent portion 142 and has a first central axis 1461. The light outlet 147 has a second central axis 1471. The first central axis 1461 and the second central axis 1471 are non-parallel. Specifically, when an angle between the first central axis 1461 and the second central axis 1471 is α, the following condition is satisfied: α=90 [deg.].

When a shortest distance of an outer contour of the first lens barrel 11 in a direction perpendicular to the first optical axis 121 is D1, and a shortest distance of an outer contour of the second lens barrel 14 in a direction perpendicular to the second optical axis 151 is D2, the following conditions are satisfied: D1=3.5 [mm]; D2=7.6 [mm]; and D1<D2.

2nd Embodiment

Figure 10:
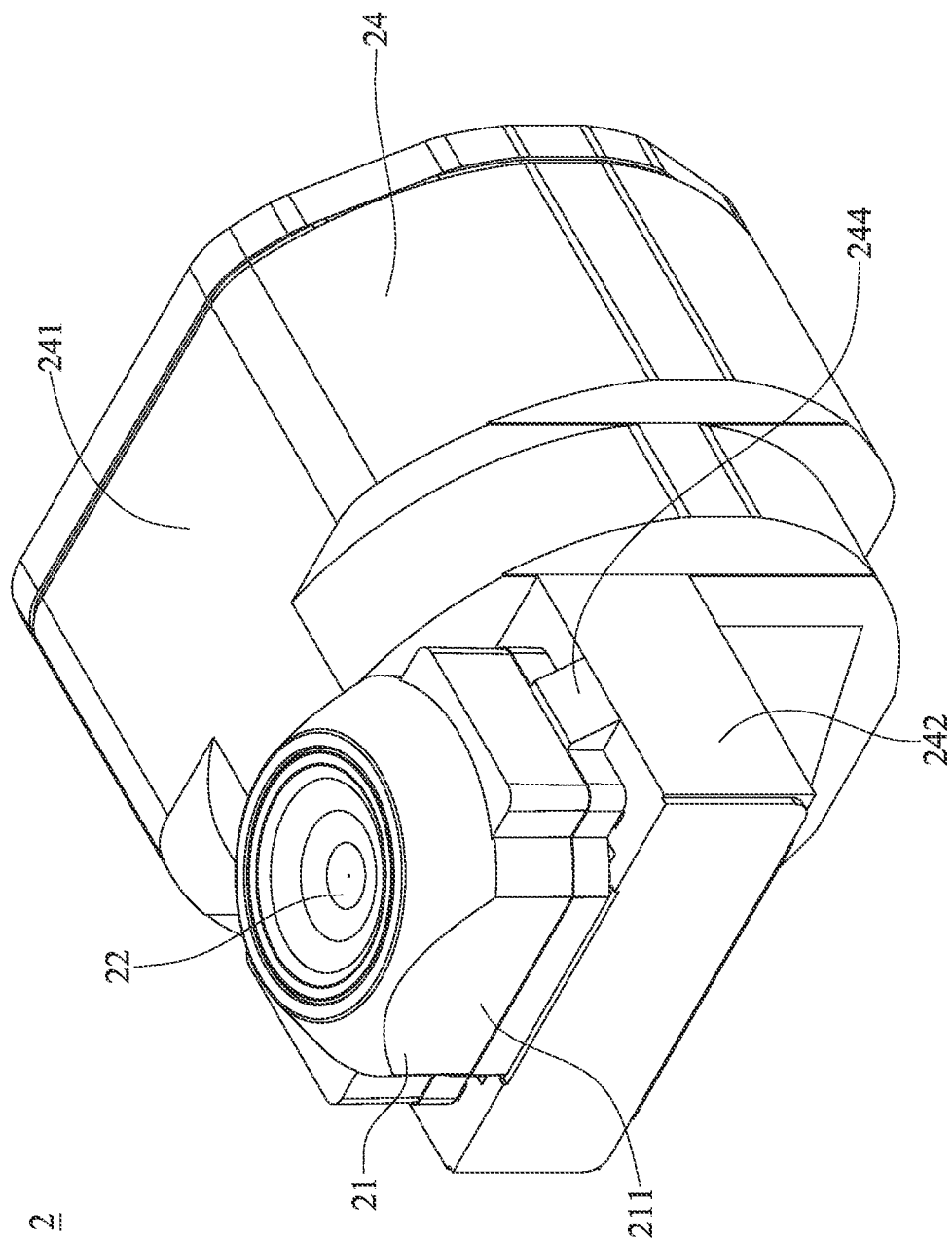
FIG. 10 is a perspective view of an optical lens module according to the 2nd embodiment of the present disclosure.
Figure 11:
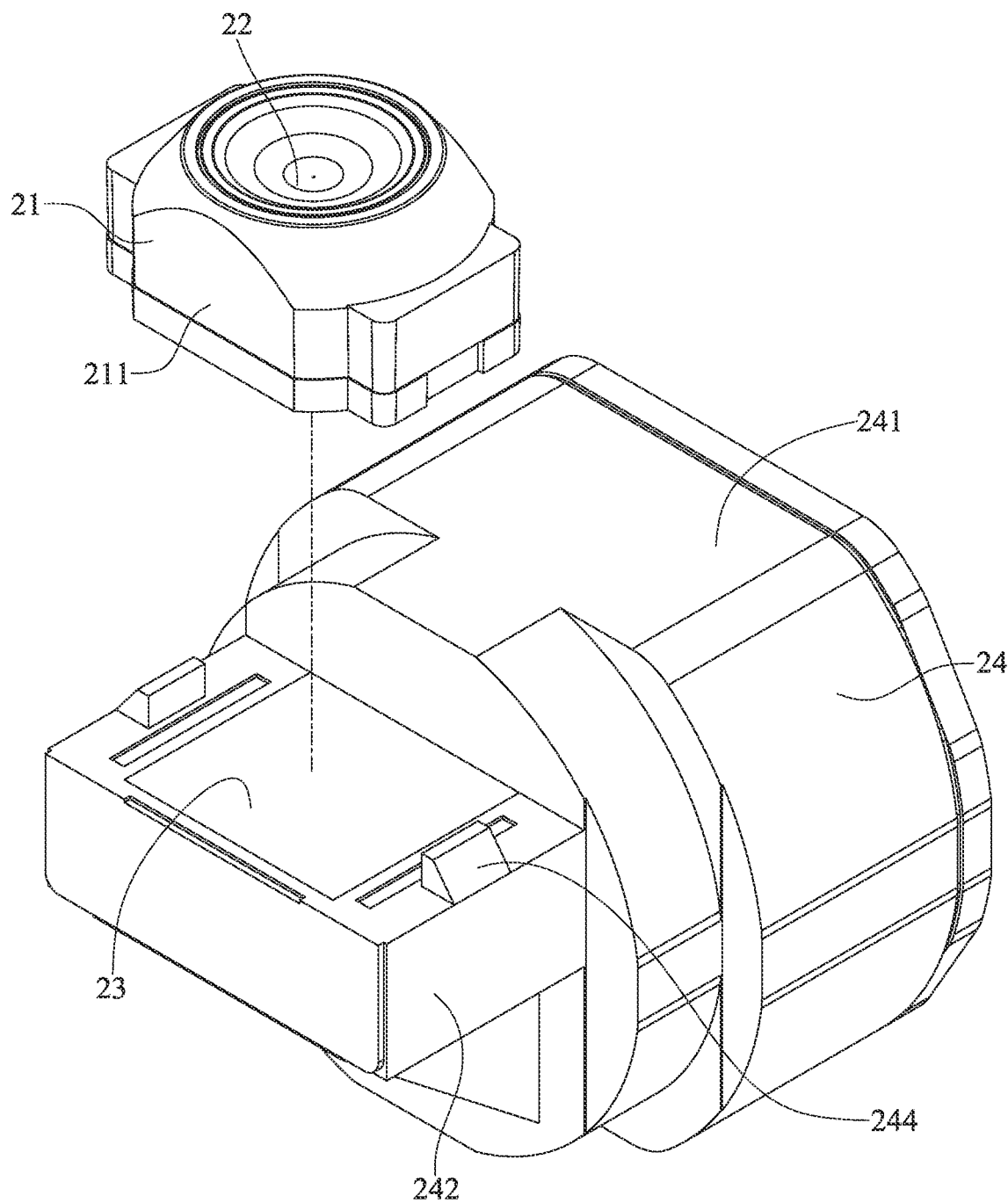
FIG. 11 is a partially exploded view of the optical lens module in FIG. 10.
Figure 12:
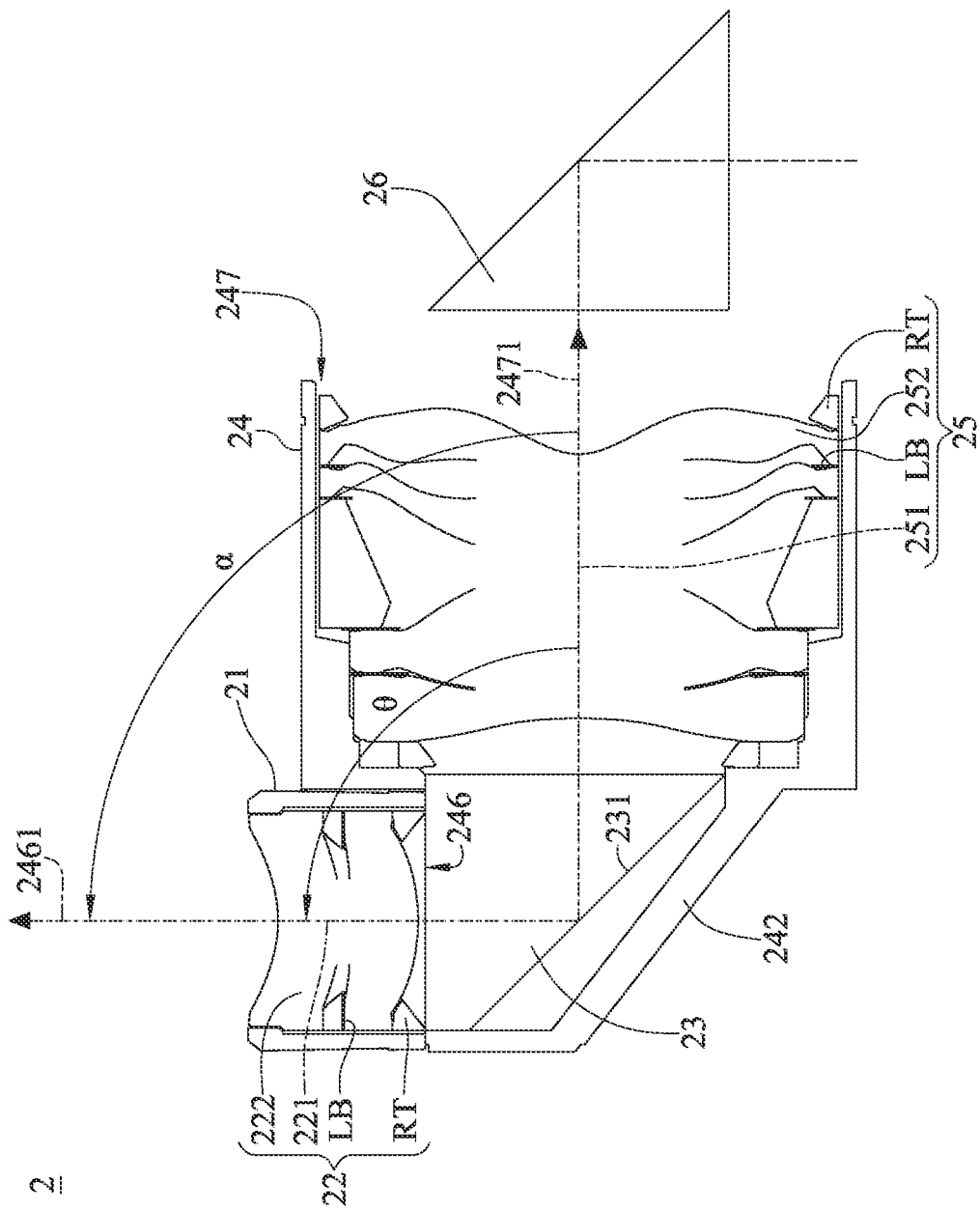
FIG. 12 is a cross-sectional view of the optical lens module in FIG. 10.

Please refer to FIG. 10 to FIG. 12, where FIG. 10 is a perspective view of an optical lens module according to the 2nd embodiment of the present disclosure, FIG. 11 is a partially exploded view of the optical lens module in FIG. 10, and FIG. 12 is a cross-sectional view of the optical lens module in FIG. 10.

In this embodiment, an optical lens module 2 includes a first lens barrel 21, a first lens assembly 22, an optical folding element 23, a second lens barrel 24 and a second lens assembly 25.

The first lens assembly 22 is fixed in the first lens barrel 21. The first lens assembly 22 has a first optical axis 221 and includes at least one lens element 222, at least one light-blocking component LB and a retainer RT.

The second lens assembly 25 is fixed in the second lens barrel 24. The second lens assembly 25 has a second optical axis 251 and includes at least one lens element 252, at least one light-blocking component LB and a retainer RT. Note that only part of the contours of the lens element 222 and the lens element 252 are shown in the drawings for simplicity, and the contours of the lens element 222 and the lens element 252 are not intended to restrict the present disclosure.

A light ray sequentially passes through the first lens assembly 22, the optical folding element 23 and the second lens assembly 25. Specifically, the optical folding element 23 has a reflection surface 231, and the first optical axis 221 and the second optical axis 251 intersect on the reflection surface 231, such that light ray is reflected into the second lens assembly 25 after passing through the first lens assembly 22.

The first lens barrel 21 has two first trimmed portions 211. Each of the first trimmed portions 211 is reduced from an outer surface of the first lens barrel 21 towards the first optical axis 221, such that a contour of the first lens barrel 21 viewed along the first optical axis 221 is non-circular. Note that at least some of the lens element 222, at least some of the light-blocking component LB and the retainer RT of the first lens assembly 22 are non-circular for adapting the non-circular first lens barrel 21.

The second lens barrel 24 has two second trimmed portions 241. Each of the second trimmed portions 241 is reduced from an outer surface of the second lens barrel 24 towards the second optical axis 251, such that a contour of the second lens barrel 24 viewed along the second optical axis 251 is non-circular. Note that at least some of the lens element 252, at least some of the light-blocking component LB and the retainer RT of the second lens assembly 25 are non-circular for adapting the non-circular second lens barrel 24.

The second lens barrel 24 is fixed to both of the first lens barrel 21 and the optical folding element 23. Specifically, the second lens barrel 24 further has a bent portion 242 which is in physical contact with at least one surface of the optical folding element 23 so as to increase assembly reliability of the optical folding element 23 and assembly efficiency of the optical lens module 2. Also, the second lens barrel 24 further has an alignment structure 244 which is disposed on the bent portion 242, such that the first lens barrel 21 can be positioned and aligned with the second lens barrel 24 through the alignment structure 244 so as to increase assembly efficiency. However, the present disclosure is not limited thereto. In some other embodiments, the bent portion may be included by the first lens barrel, and the alignment structure is disposed on the bent portion of the first lens barrel.

As shown in FIG. 12, the optical lens module 2 further includes another optical folding element 26 for meeting various assembly requirements, but the present disclosure is not limited thereto.

When an angle between the first optical axis 221 and the second optical axis 251 is $\theta$, the following condition is satisfied: $\theta=90$ [deg.].

The second lens barrel 24 further has a light inlet 246 and a light outlet 247. The light inlet 246 is defined by the bent portion 242 and has a first central axis 2461. The light outlet 247 has a second central axis 2471. The first central axis 2461 and the second central axis 2471 are non-parallel. Specifically, when an angle between the first central axis 2461 and the second central axis 2471 is $\alpha$, the following condition is satisfied: $\alpha=90$ [deg.].

3rd Embodiment

Figure 13:
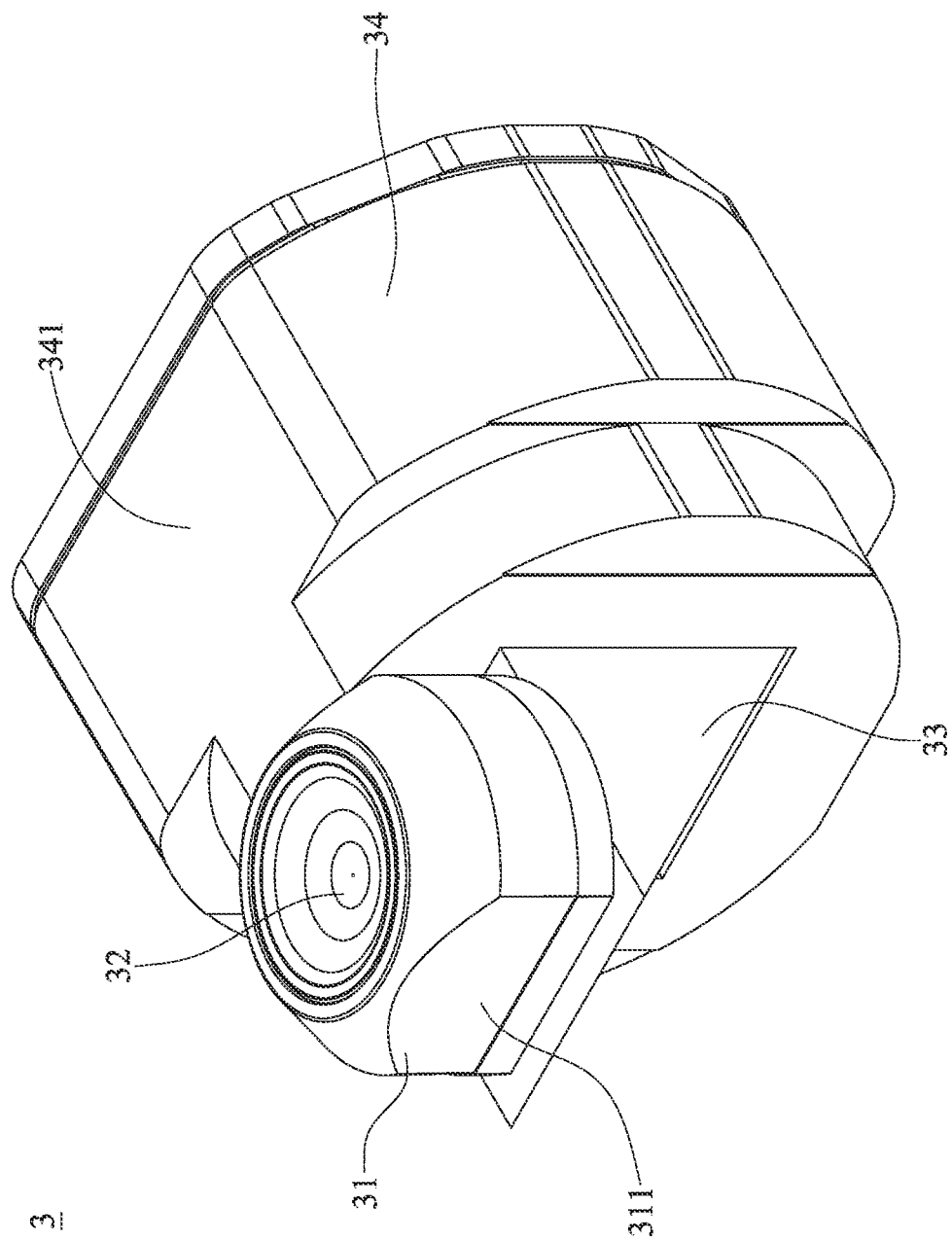
FIG. 13 is a perspective view of an optical lens module according to the 3rd embodiment of the present disclosure.
Figure 14:
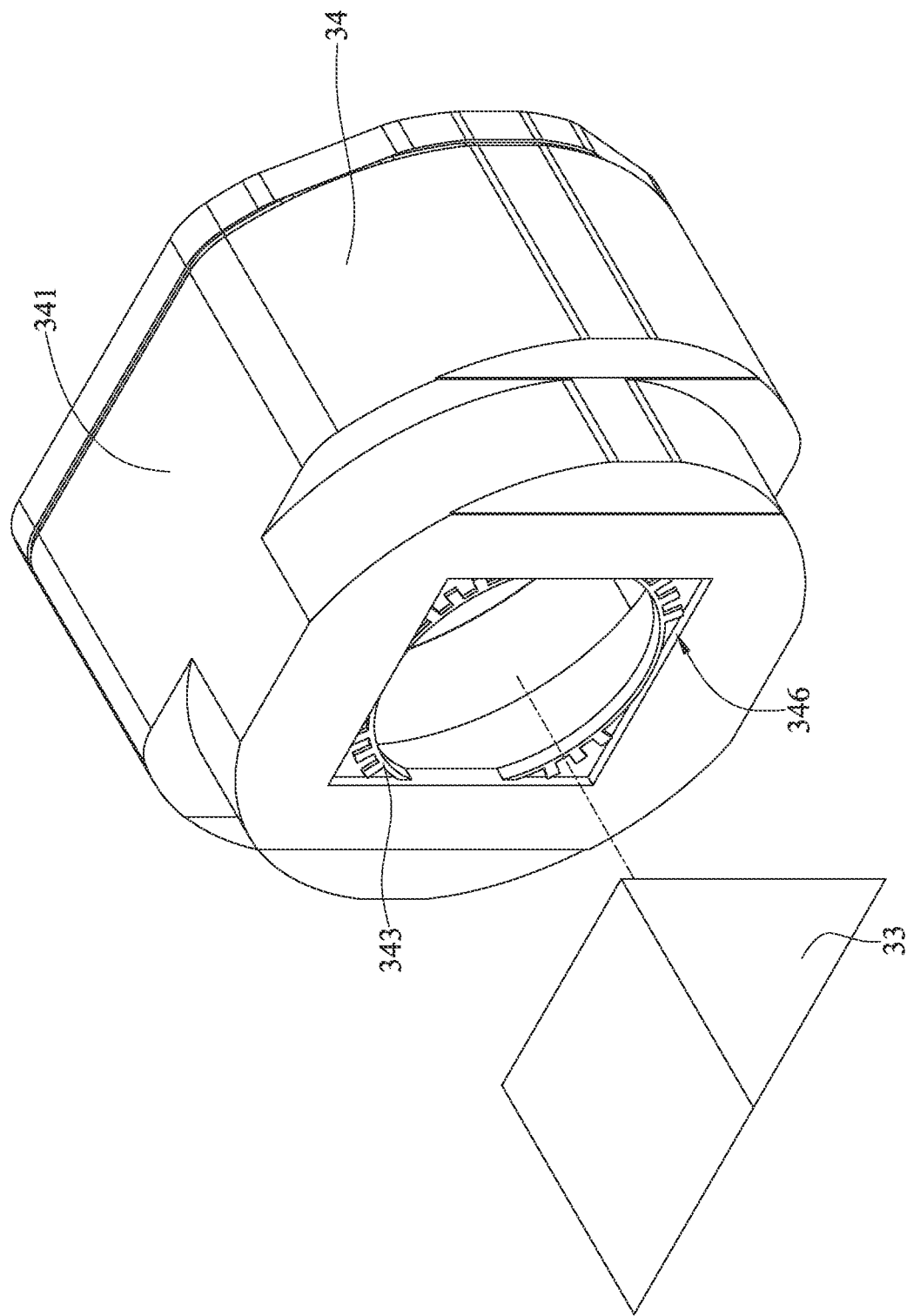
FIG. 14 is an exploded view showing an optical folding element and a second lens barrel of the optical lens module in FIG. 13.
Figure 15:
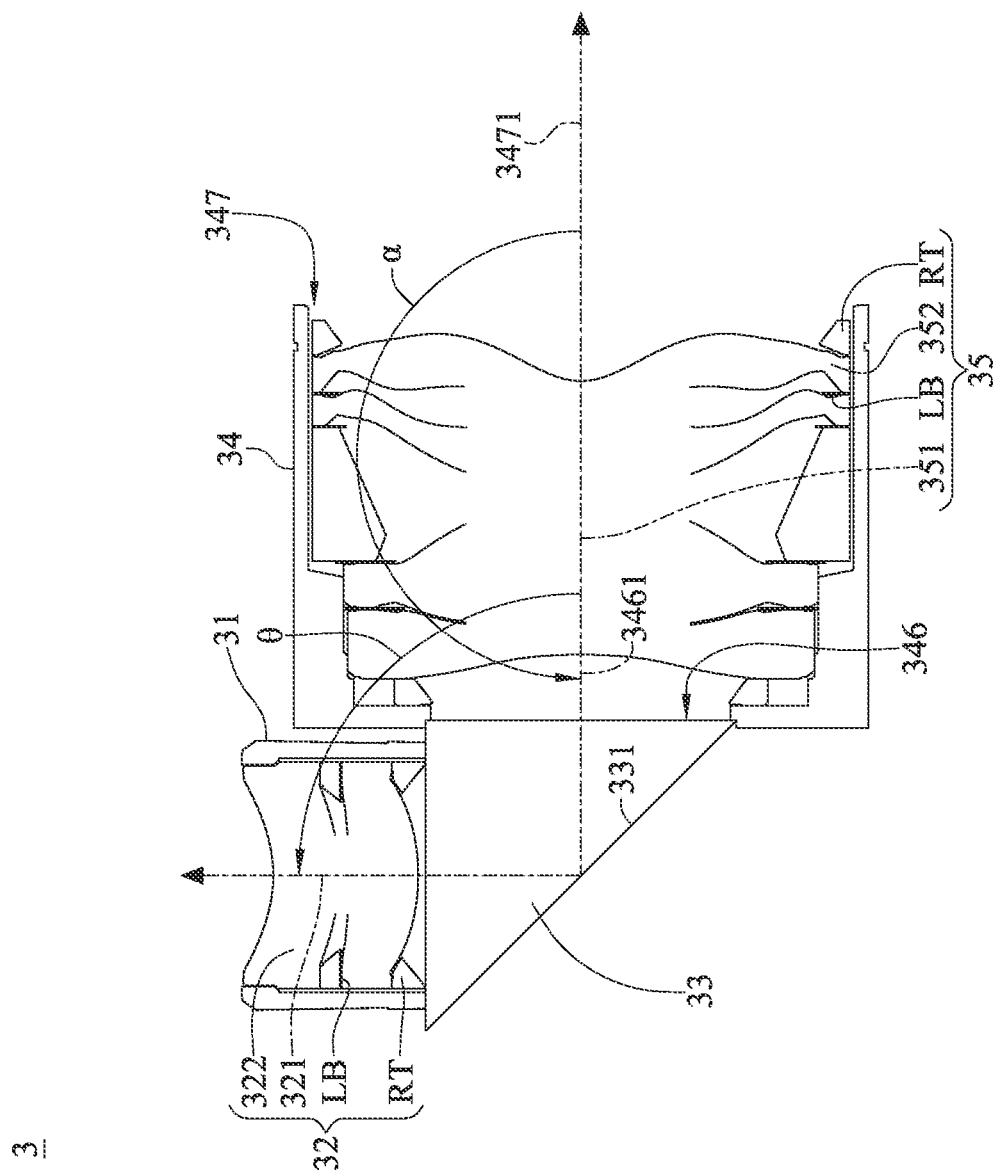
FIG. 15 is a cross-sectional view of the optical lens module in FIG. 13.

Please refer to FIG. 13 to FIG. 15, where FIG. 13 is a perspective view of an optical lens module according to the 3rd embodiment of the present disclosure, FIG. 14 is an exploded view showing an optical folding element and a second lens barrel of the optical lens module in FIG. 13, and FIG. 15 is a cross-sectional view of the optical lens module in FIG. 13.

In this embodiment, an optical lens module 3 includes a first lens barrel 31, a first lens assembly 32, an optical folding element 33, a second lens barrel 34 and a second lens assembly 35.

The first lens assembly 32 is fixed in the first lens barrel 31. The first lens assembly 32 has a first optical axis 321 and includes at least one lens element 322, at least one light-blocking component LB and a retainer RT.

The second lens assembly 35 is fixed in the second lens barrel 34. The second lens assembly 35 has a second optical axis 351 and includes at least one lens element 352, at least one light-blocking component LB and a retainer RT. Note that only part of the contours of the lens element 322 and the lens element 352 are shown in the drawings for simplicity, and the contours of the lens elements 322 and the lens elements 352 are not intended to restrict the present disclosure.

A light ray sequentially passes through the first lens assembly 32, the optical folding element 33 and the second lens assembly 35. Specifically, the optical folding element 33 has a reflection surface 331, and the first optical axis 321 and the second optical axis 351 intersect on the reflection surface 331, such that light ray is reflected into the second lens assembly 35 after passing through the first lens assembly 32.

The first lens barrel 31 has two first trimmed portions 311. Each of the first trimmed portions 311 is reduced from an outer surface of the first lens barrel 31 towards the first optical axis 321, such that a contour of the first lens barrel 31 viewed along the first optical axis 321 is non-circular. Note that at least some of the lens elements 322, at least some of the light-blocking component LB and the retainer RT of the first lens assembly 32 are non-circular for adapting the non-circular first lens barrel 31.

The second lens barrel 34 has two second trimmed portions 341. Each of the second trimmed portions 341 is reduced from an outer surface of the second lens barrel 34 towards the second optical axis 351, such that a contour of the second lens barrel 34 viewed along the second optical axis 351 is non-circular. Note that at least some of the lens element 352, at least some of the light-blocking component LB and the retainer RT of the second lens assembly 35 are non-circular for adapting the non-circular second lens barrel 34.

The optical folding element 33 is fixed to each of the first lens barrel 31 and the second lens barrel 34, with no direct assembly relationship between the first lens barrel 31 and the second lens barrel 34. Specifically, the second lens barrel 34 further has an adhesive receiving structure 343. The optical folding element 33 can be fixed to the second lens barrel 34 via the adhesive receiving structure 343, then the first lens barrel 31 is aligned with the optical folding element 33, and then adhesive can be dispensed on the adhesive receiving structure 343 for positioning and assembling the first lens barrel 31, the optical folding element 33 and the second lens barrel 34. However, the present disclosure is not limited thereto. In some other embodiments, the adhesive receiving structure may be included by the first lens barrel.

When an angle between the first optical axis 321 and the second optical axis 351 is θ, the following condition is satisfied: θ=90 [deg.].

The second lens barrel 34 further has a light inlet 346 and a light outlet 347. The light inlet 346 has a first central axis 3461. The light outlet 347 has a second central axis 3471. When an angle between the first central axis 3461 and the second central axis 3471 is α, the following condition is satisfied: α=180 [deg.].

4th Embodiment

Figure 16:
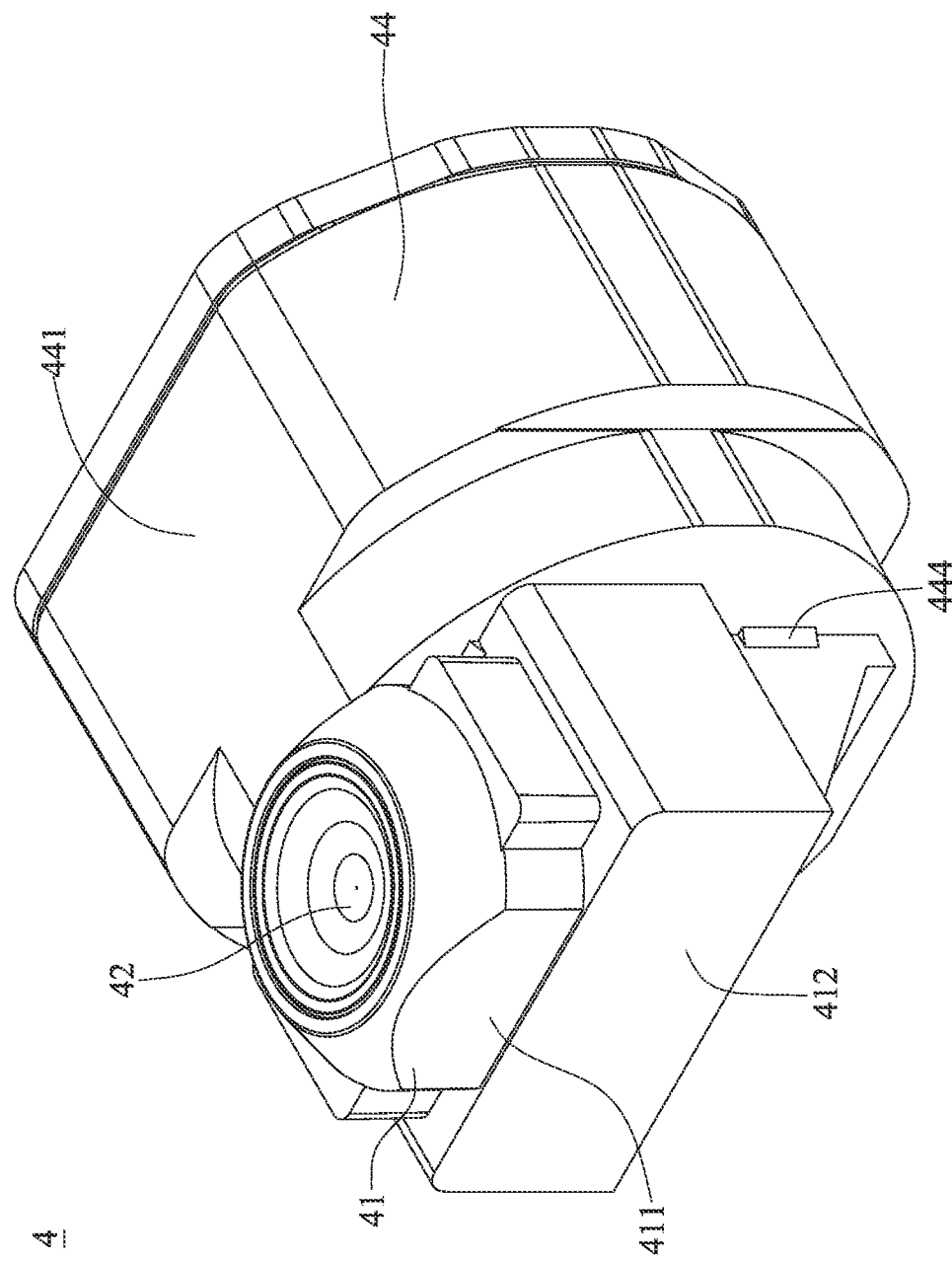
FIG. 16 is a perspective view of an optical lens module according to the 4th embodiment of the present disclosure.
Figure 17:
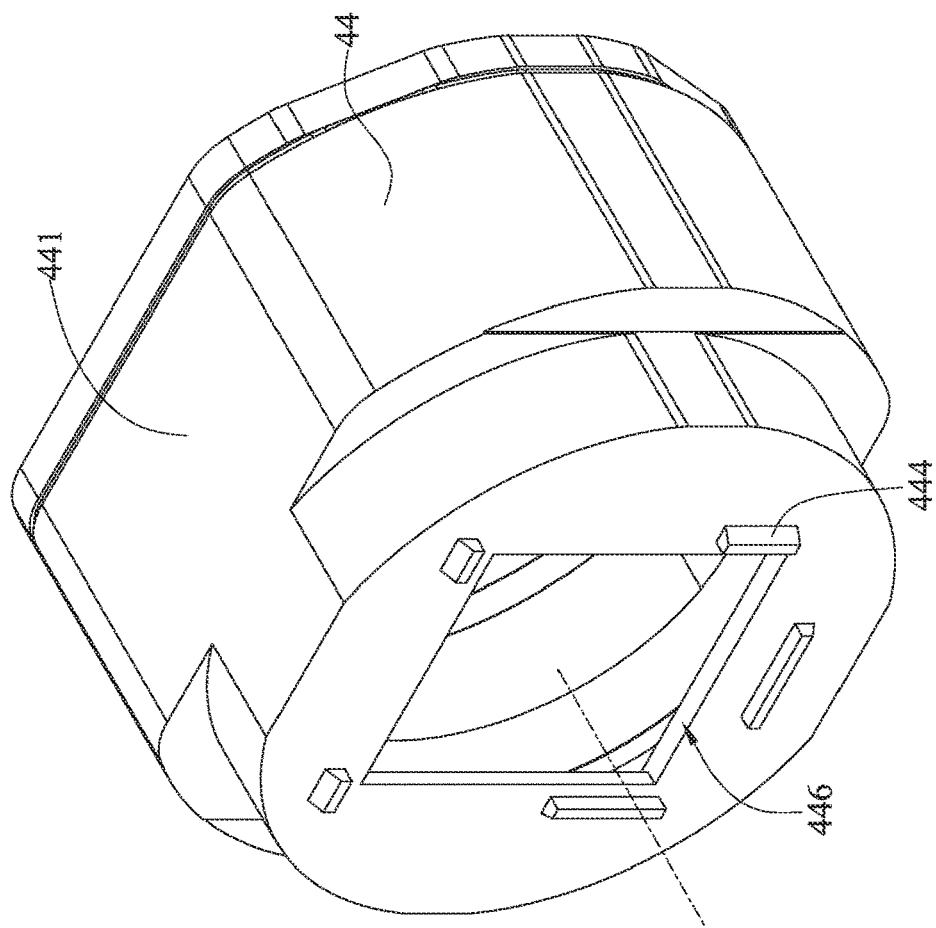
FIG. 17 is an exploded view showing a first lens barrel and a second lens barrel of the optical lens module in FIG. 16.
Figure 17:
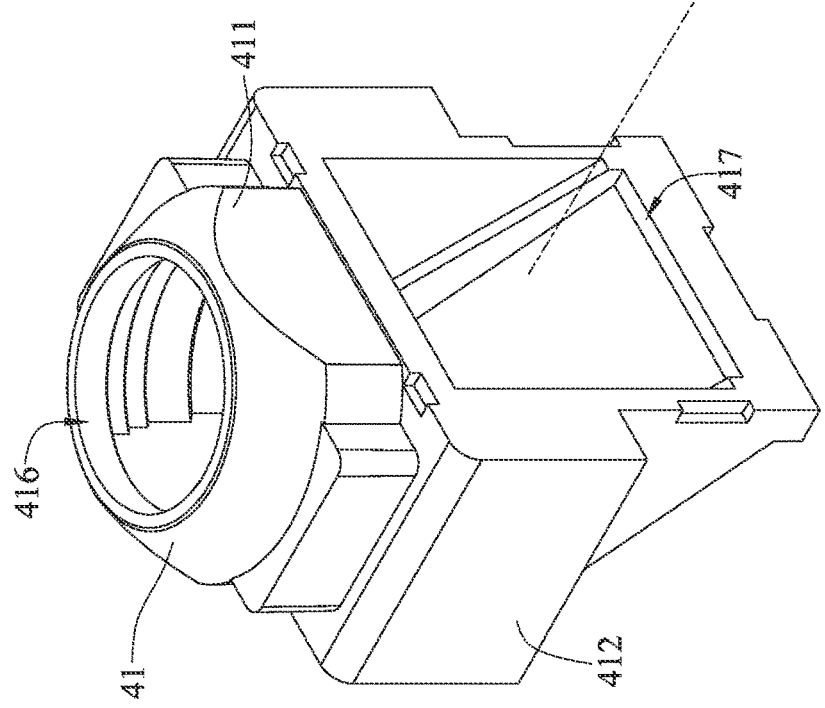
Figure 18:
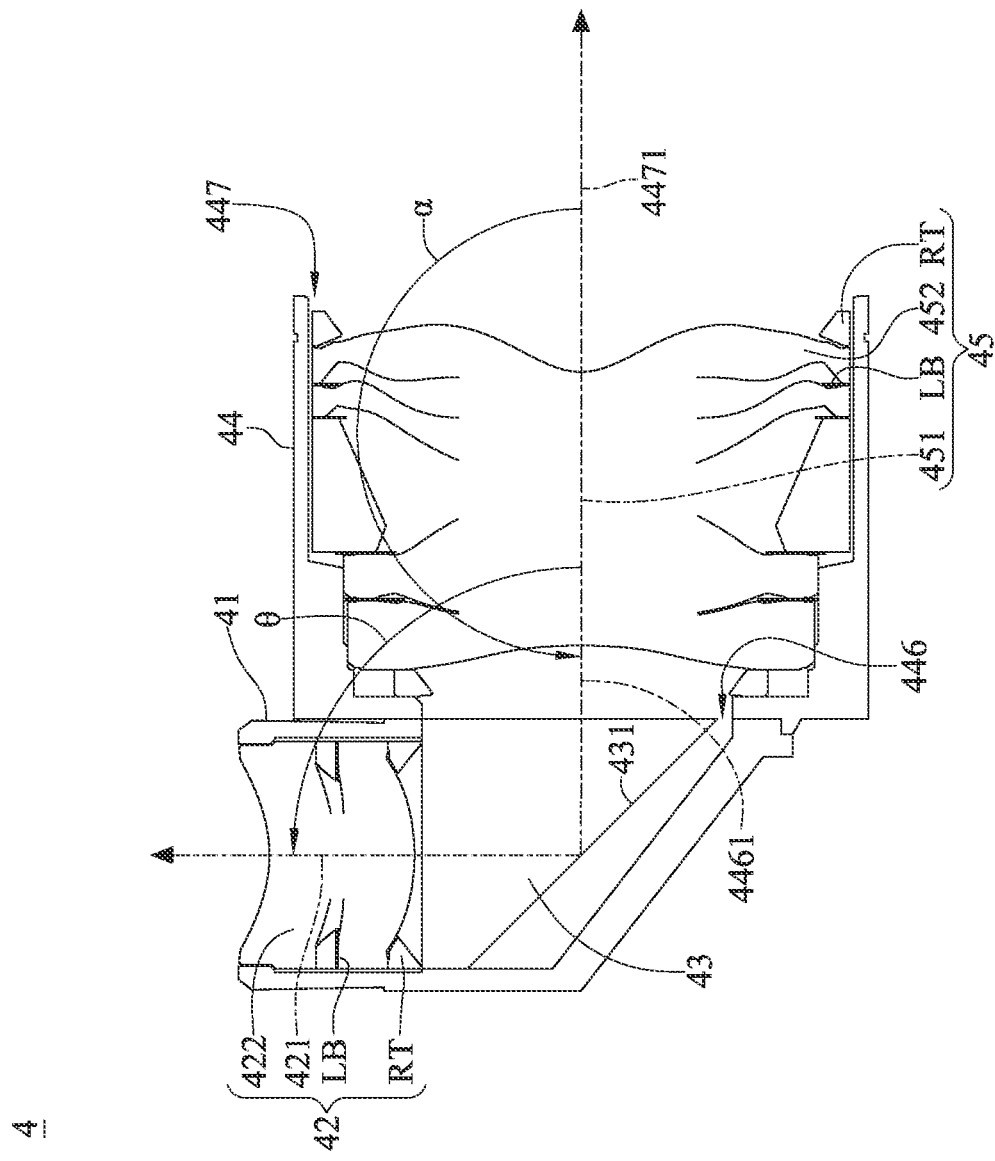
FIG. 18 is a cross-sectional view of the optical lens module in FIG. 16.
Figure 19:
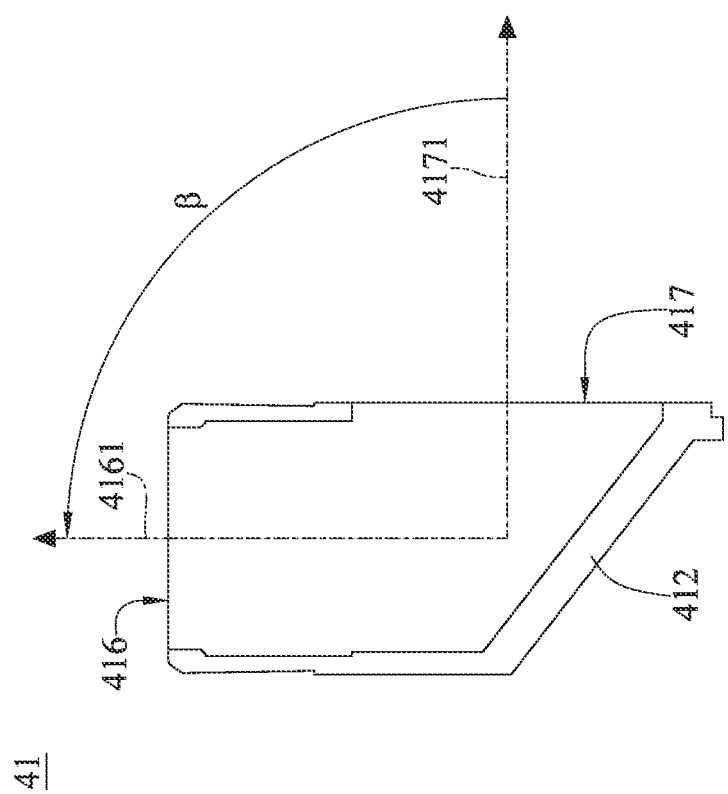
FIG. 19 is a cross-sectional view of the first lens barrel of the optical lens module in FIG. 16.

Please refer to FIG. 16 to FIG. 19, where FIG. 16 is a perspective view of an optical lens module according to the 4th embodiment of the present disclosure, FIG. 17 is an exploded view showing a first lens barrel and a second lens barrel of the optical lens module in FIG. 16, FIG. 18 is a cross-sectional view of the optical lens module in FIG. 16, and FIG. 19 is a cross-sectional view of the first lens barrel of the optical lens module in FIG. 16.

In this embodiment, an optical lens module 4 includes a first lens barrel 41, a first lens assembly 42, an optical folding element 43, a second lens barrel 44 and a second lens assembly 45.

The first lens assembly 42 is fixed in the first lens barrel 41. The first lens assembly 42 has a first optical axis 421 and includes at least one lens element 422, at least one light-blocking component LB and a retainer RT.

The second lens assembly 45 is fixed in the second lens barrel 44. The second lens assembly 45 has a second optical axis 451 and includes at least one lens element 452, at least one light-blocking component LB and a retainer RT. Note that only part of the contours of the lens element 422 and the lens element 452 are shown in the drawings for simplicity, and the contours of the lens element 422 and the lens element 452 are not intended to restrict the present disclosure.

A light ray sequentially passes through the first lens assembly 42, the optical folding element 43 and the second lens assembly 45. Specifically, the optical folding element 43 has a reflection surface 431, and the first optical axis 421 and the second optical axis 451 intersect on the reflection surface 431, such that light ray is reflected into the second lens assembly 45 after passing through the first lens assembly 42.

The first lens barrel 41 has two first trimmed portions 411. Each of the first trimmed portions 411 is reduced from an outer surface of the first lens barrel 41 towards the first optical axis 421, such that a contour of the first lens barrel 41 viewed along the first optical axis 421 is non-circular. Note that at least some of the lens element 422, at least some of the light-blocking component LB and the retainer RT of the first lens assembly 42 are non-circular for adapting the non-circular first lens barrel 41.

The second lens barrel 44 has two second trimmed portions 441. Each of the second trimmed portions 441 is reduced from an outer surface of the second lens barrel 44 towards the second optical axis 451, such that a contour of the second lens barrel 44 viewed along the second optical axis 451 is non-circular. Note that at least some of the lens element 452, at least some of the light-blocking component LB and the retainer RT of the second lens assembly 45 are non-circular for adapting the non-circular second lens barrel 44.

The first lens barrel 41 is fixed to both of the second lens barrel 44 and the optical folding element 43. Specifically, the first lens barrel 41 further has a bent portion 412 which is in physical contact with at least one surface of the optical folding element 43 so as to increase assembly reliability of the optical folding element 43 and assembly efficiency of the optical lens module 4. Also, the second lens barrel 44 further has an alignment structure 444 which is engaged with the bent portion 412, such that the first lens barrel 41 can be positioned and aligned with the second lens barrel 44 through the alignment structure 444 so as to increase assembly efficiency. However, the present disclosure is not limited thereto. In some other embodiments, the bent portion may be included by the second lens barrel, and the alignment structure may be included by the first lens barrel.

When an angle between the first optical axis 421 and the second optical axis 451 is θ, the following condition is satisfied: θ=90 [deg.].

The second lens barrel 44 further has a light inlet 446 and a light outlet 447. The light inlet 446 has a first central axis 4461. The light outlet 447 has a second central axis 4471. When an angle between the first central axis 4461 and the second central axis 4471 is α, the following condition is satisfied: α=180 [deg.].

The first lens barrel 41 further has a light inlet 416 and a light outlet 417. The light inlet 416 has a third central axis 4161. The light outlet 417 is defined by the bent portion 412 and has a fourth central axis 4171. The third central axis 4161 and the fourth central axis 4171 are non-parallel. Specifically, when an angle between the third central axis 4161 and the fourth central axis 4171 is β, the following condition is satisfied: β=90 [deg.].

5th Embodiment

Figure 20:
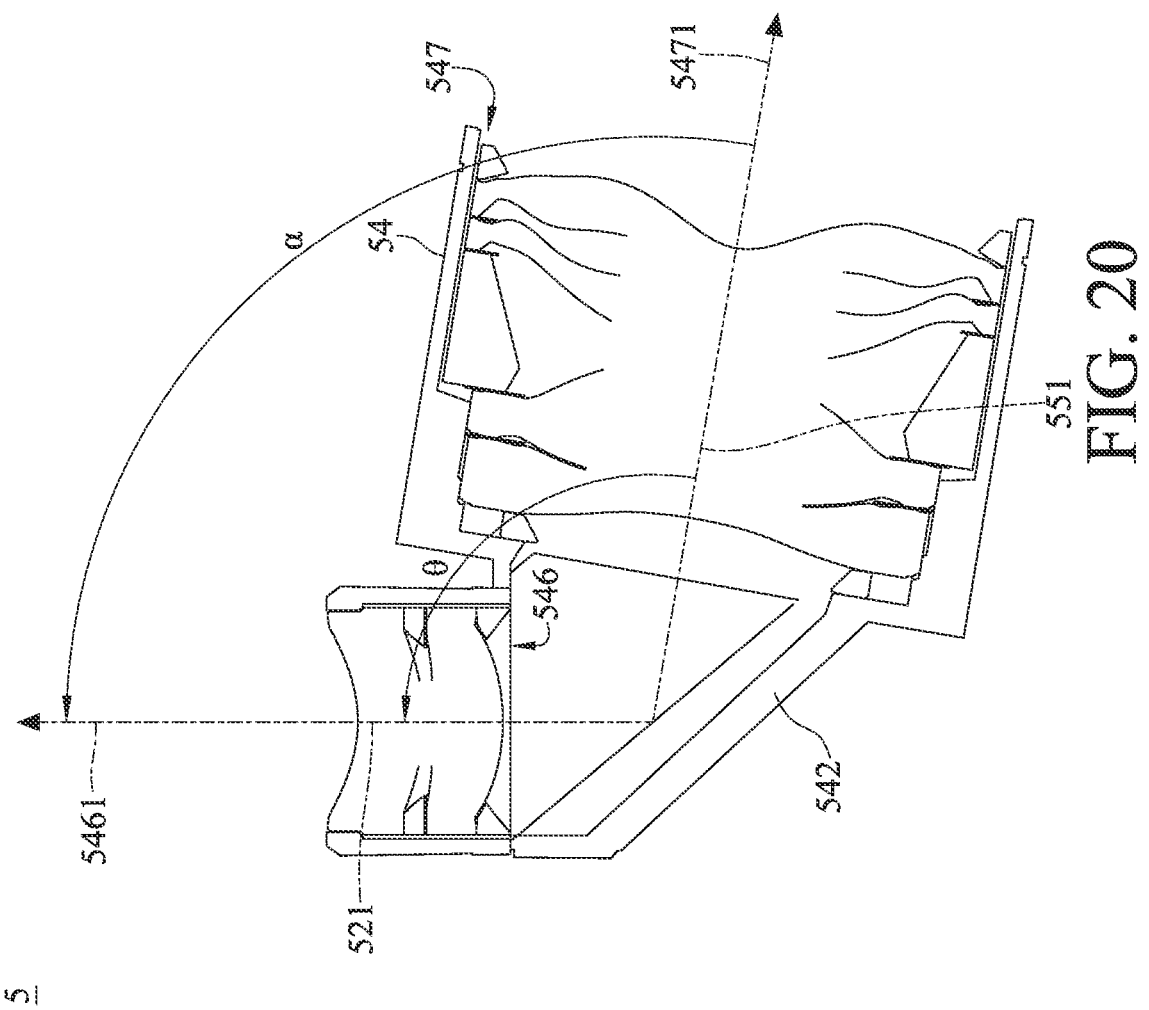
FIG. 20 is a cross-sectional view of an optical lens module according to the 5th embodiment of the present disclosure.

Please refer to FIG. 20, which is a cross-sectional view of an optical lens module according to the 5th embodiment of the present disclosure. Note that the optical lens module 5 in this embodiment is similar to the abovementioned optical lens module 1 in the 1st embodiment. Only differences between this and the 1st embodiments will be illustrated hereinafter.

When an angle between the first optical axis 521 and the second optical axis 551 is θ, the following condition is satisfied: θ=100 [deg.].

The second lens barrel 54 further has a light inlet 546 and a light outlet 547. The light inlet 546 is defined by the bent portion 542 and has a first central axis 5461. The light outlet 547 has a second central axis 5471. The first central axis 5461 and the second central axis 5471 are non-parallel. Specifically, when an angle between the first central axis 5461 and the second central axis 5471 is α, the following condition is satisfied: α=100 [deg.].

6th Embodiment

Figure 21:
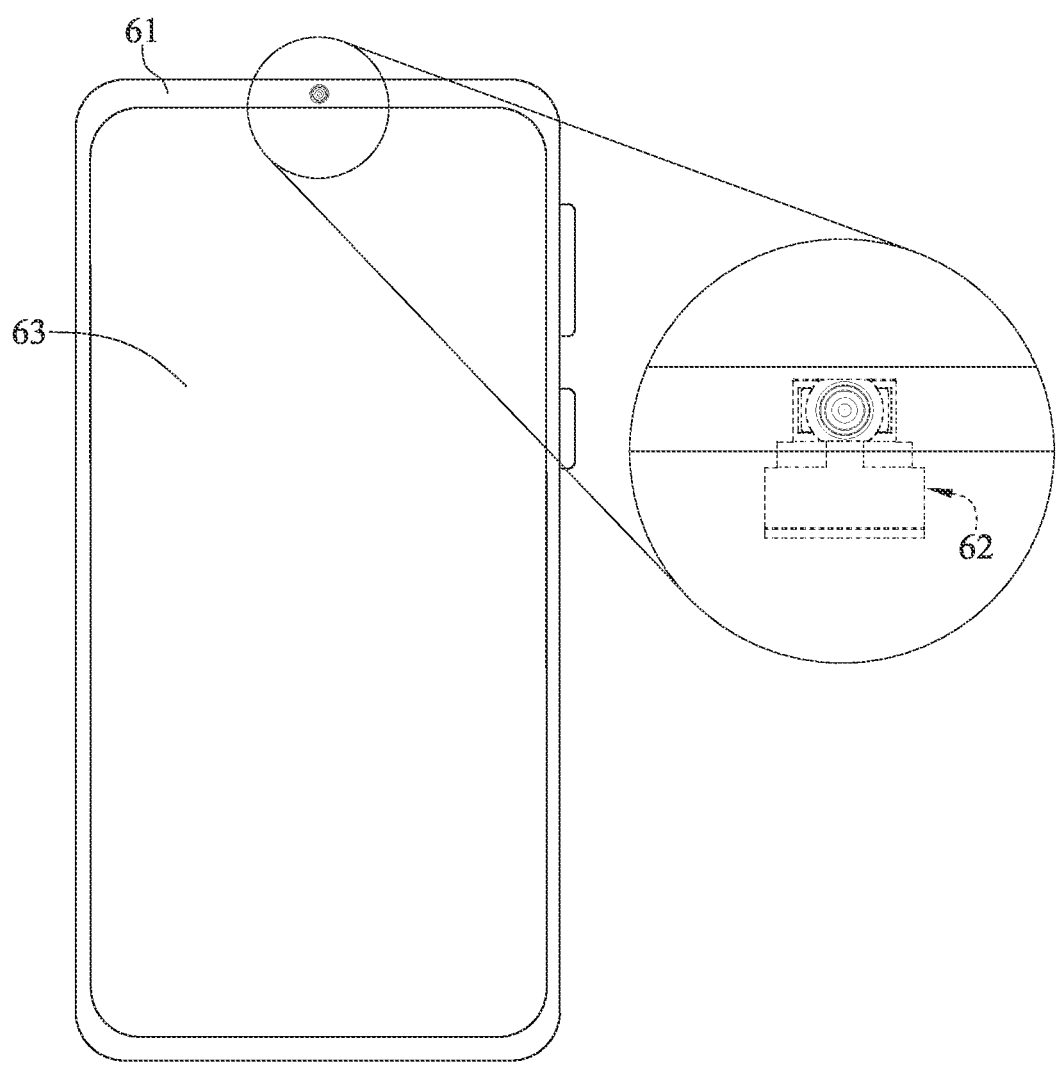
FIG. 21 is a front view of an electronic device according to the 6th embodiment of the present disclosure.
Figure 22:
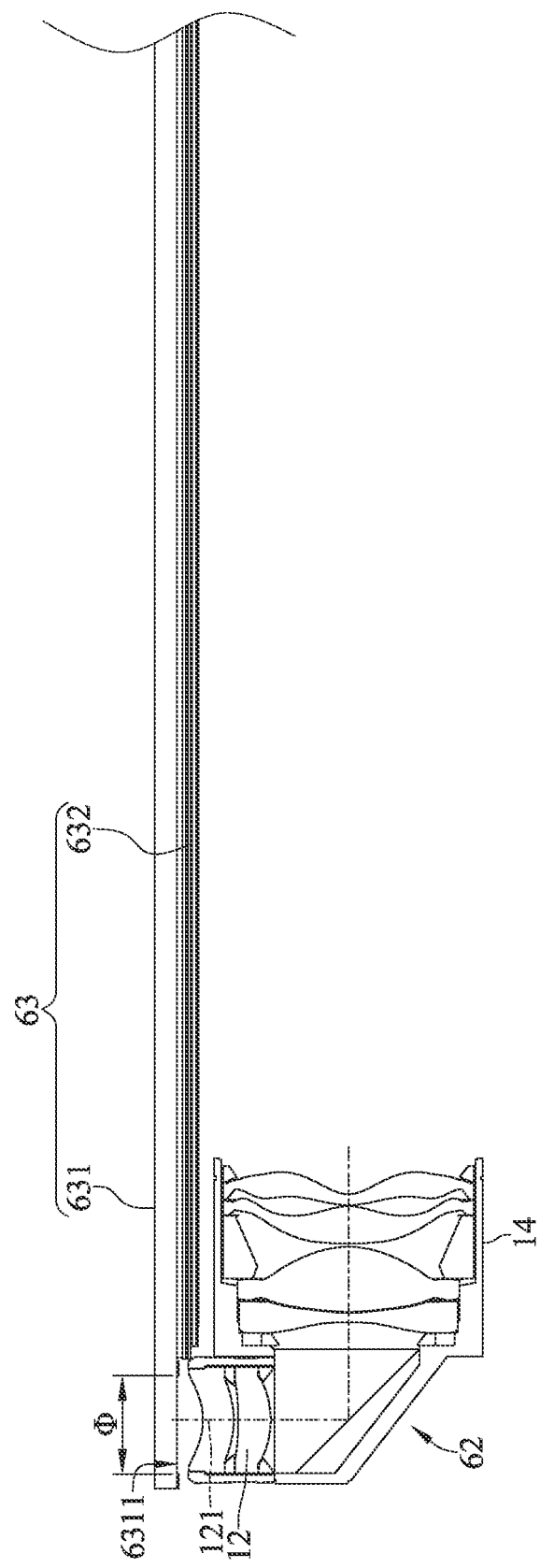
FIG. 22 is a cross-sectional view of part of the electronic device in FIG. 21.

Please refer to FIG. 21 to FIG. 22, where FIG. 21 is a front view of an electronic device according to the 6th embodiment of the present disclosure, and FIG. 22 is a cross-sectional view of part of the electronic device in FIG. 21.

In this embodiment, an electronic device 6 is a mobile phone and includes a casing 61, an optical lens module 62 and a display panel module 63. The optical lens module 62 is disposed in the casing 61 and has high imaging quality. In specific, the optical lens module 62 may be the abovementioned optical lens module 1, but the present disclosure is not limited thereto. In some other embodiments, the optical lens module 62 may be one of the optical lens modules 2-5. The display panel module 63 is disposed in the casing 61 and includes a cover 631 and a display area 632.

The cover 631 provides protection and touch functions and has a light passage opening 6311. Light ray enters the first lens assembly 12 via the light passage opening 6311, the first optical axis 121 passes through the light passage opening 6311, and a projection of the second lens barrel 14 in a direction in parallel with the first optical axis 121 is at least partially overlapped with the display area 632. Moreover, the light passage opening 6311 can be located within the display area 632 or integrated into the upper frame of the casing 61, such that the display effect of the display panel module 63 can achieve relatively high consistency so as to increase user's experience.

The display area 632 provides a display function. Viewing from the front side of the electronic device 6, a ratio of the area of the display area 632 to the area surrounded by the outer contour of the casing 61 can be 85% or more, such that the electronic device 6 is a mobile phone with high screen-to-body ratio. Moreover, the ratio of the area of the display area 632 to the area surrounded by the outer contour of the casing 61 can also be 90% or more. Moreover, the ratio of the area of the display area 632 to the area surrounded by the outer contour of the casing 61 can also be 95% or more.

When a longest distance of the light passage opening 6311 along a direction perpendicular to the first optical axis 121 is $\Phi$, the following condition is satisfied: 0.75 [mm]$\leq\Phi\leq$3.9 [mm]. Therefore, it is favorable for arranging the optical lens module 1 with high-end specifications in a limited space and for reducing the diameter of the light passage opening 6311 so as to improve use's experience of the electronic device 6. Moreover, the following condition can also be satisfied: $\Phi$=2.9 [mm].

7th Embodiment

Figure 23:
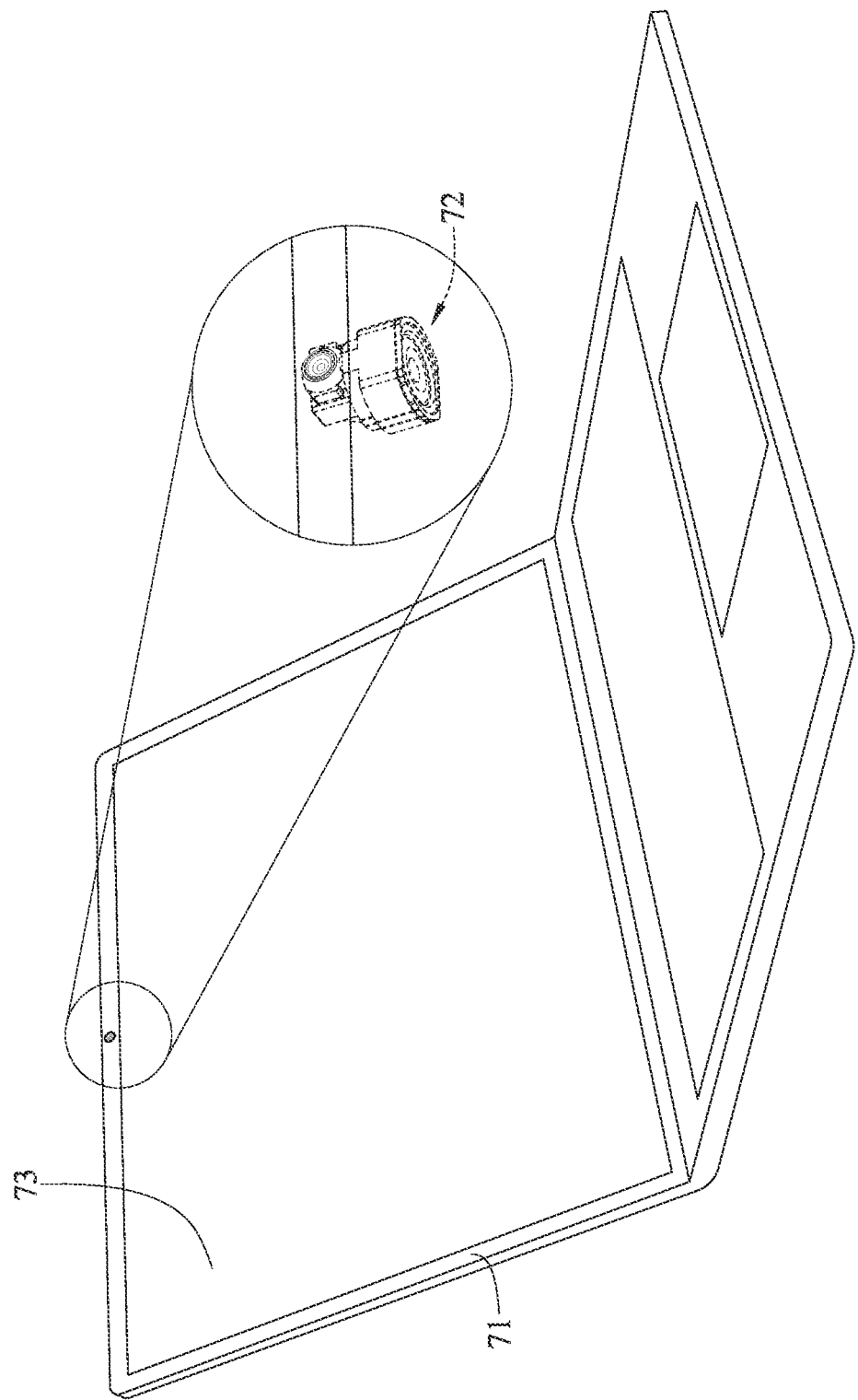
FIG. 23 is a perspective view of an electronic device according to the 7th embodiment of the present disclosure.

The abovementioned electronic device 6 in the 6th embodiment as a mobile phone is only exemplary, and the present disclosure is not limited thereto. Please refer to FIG. 23, which is a perspective view of an electronic device according to the 7th embodiment of the present disclosure. In this embodiment, an electronic device 7 is a notebook computer including a casing 71, an optical lens module 72 and a display panel module 73. Moreover, the optical lens module 72 is one of the optical lens modules 1-5.

8th Embodiment

The abovementioned electronic device 6 in the 6th embodiment as a mobile phone is only exemplary, and the present disclosure is not limited thereto. Please refer to FIG. 24, which is a perspective view of an electronic device according to the 8th embodiment of the present disclosure. In this embodiment, an electronic device 8 is an augmented reality (AR) device including a casing 81, an optical lens module 82 and a display panel module 83. Moreover, the optical lens module 82 is one of the optical lens modules 1-5.

Figure 24:
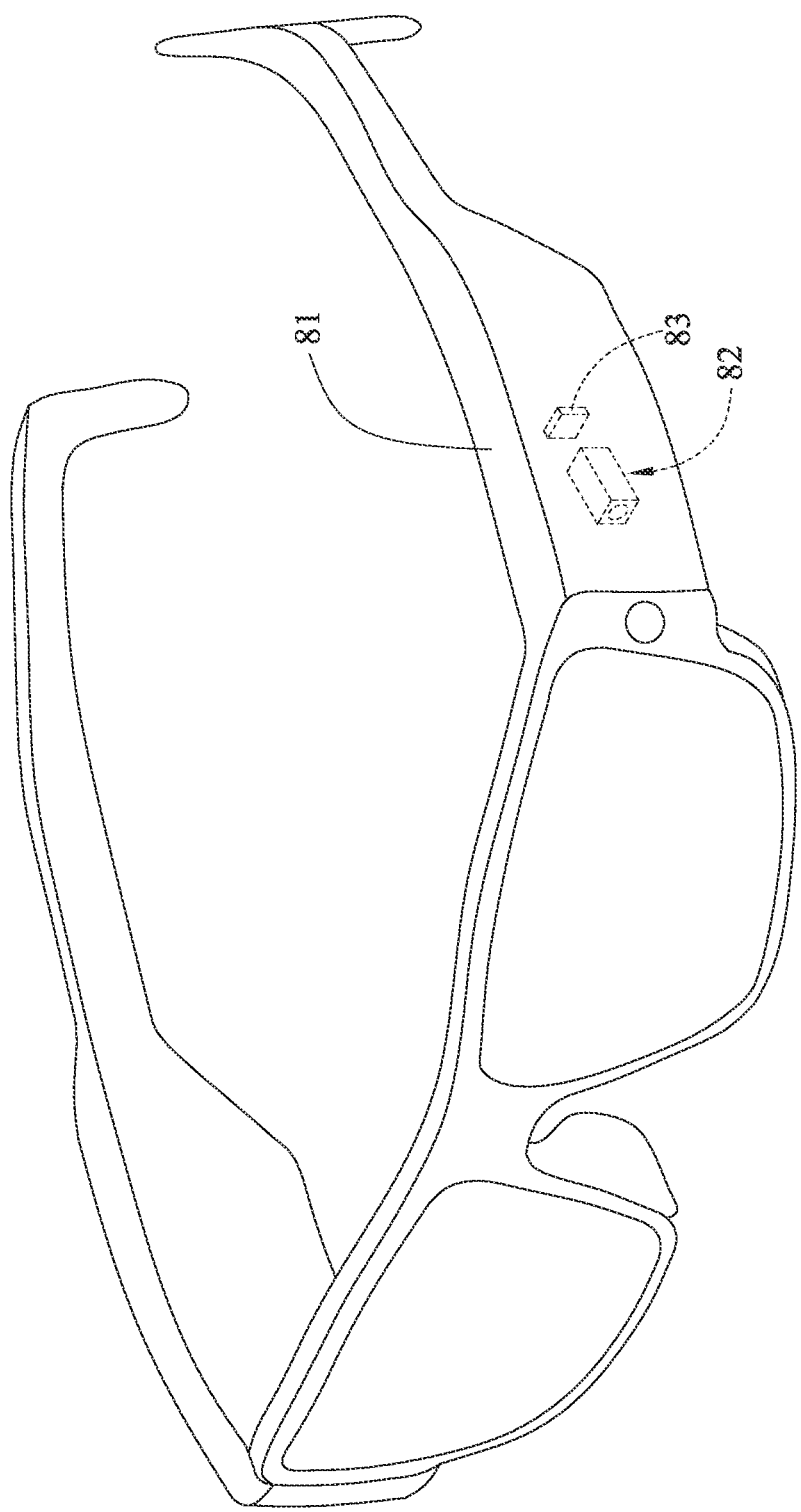
FIG. 24 is a perspective view of an electronic device according to the 8th embodiment of the present disclosure.
Figure 25:
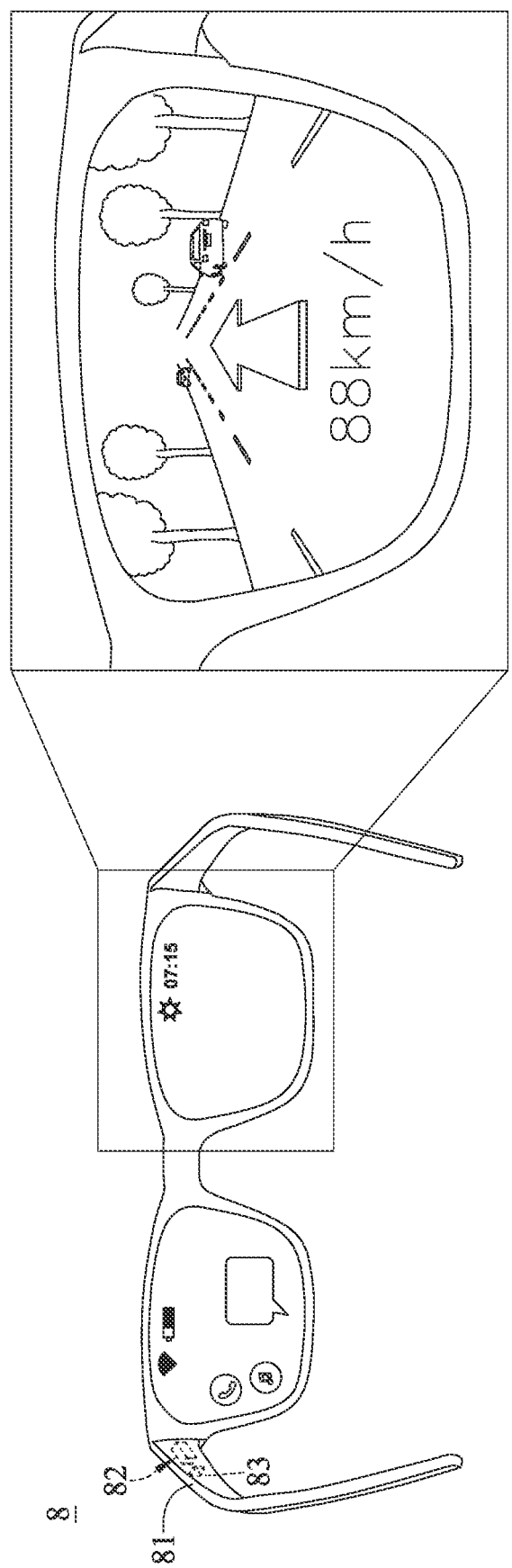
FIG. 25 is a schematic view showing the usage scenario of the electronic device in FIG. 24.

The casing 81 has a shape similar to a spectacle frame, such that the electronic device 8 can be worn in front of user's eyes to provide functions such as call, message notification, music play and navigation or to provide information such as weather, time, traffic report and vehicle speed, as shown in FIG. 25, which is a schematic view showing the usage scenario of the electronic device in FIG. 24.

9th Embodiment

Figure 26:
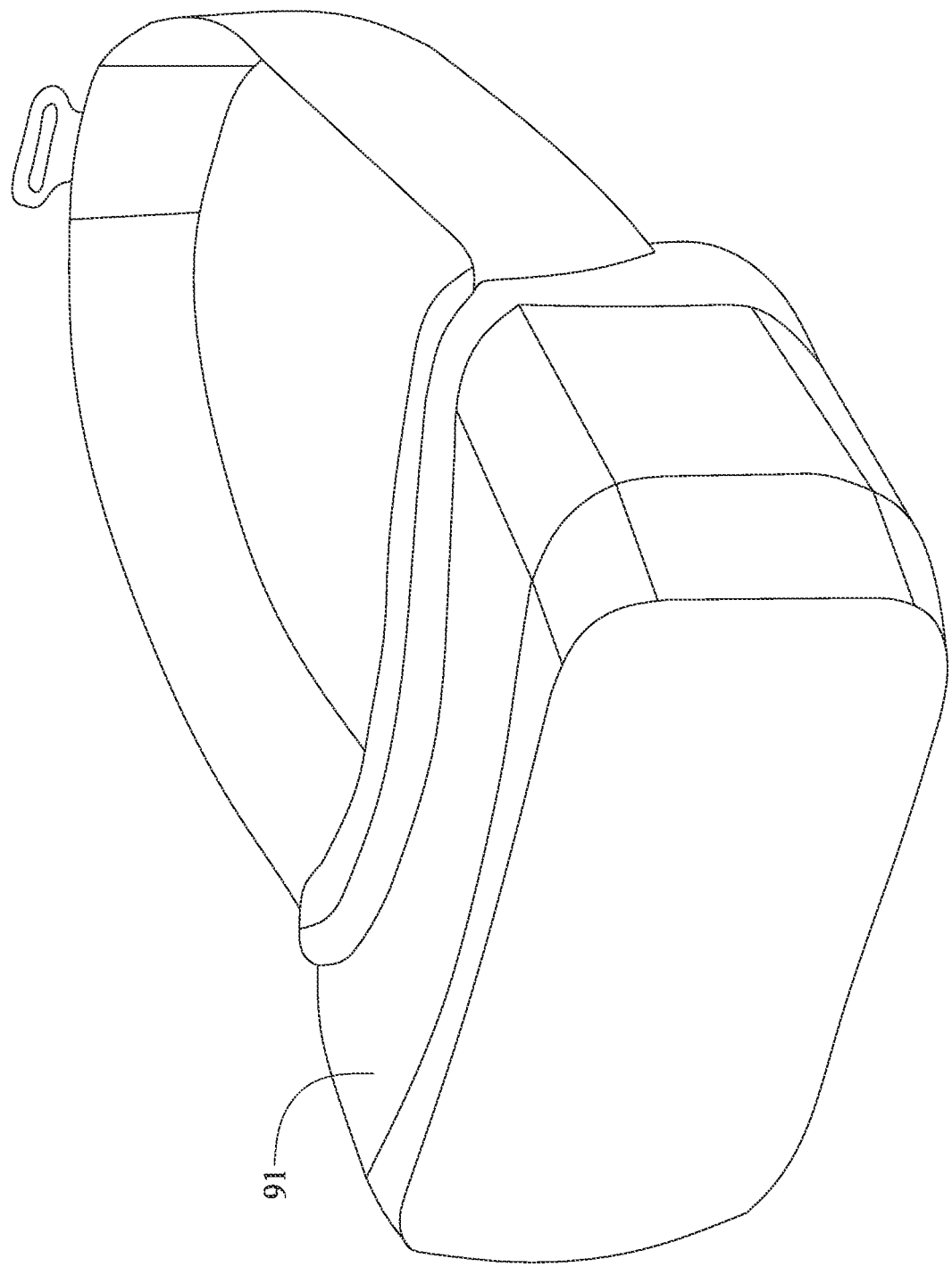
FIG. 26 is a perspective view of an electronic device according to the 9th embodiment of the present disclosure.

The abovementioned electronic device 8 in the 8th embodiment as an AR device is only exemplary, and the present disclosure is not limited thereto. Please refer to FIG. 26, which is a perspective view of an electronic device according to the 9th embodiment of the present disclosure. In this embodiment, an electronic device 9 is a virtual reality (VR) device including a casing 91, an optical lens module 92 and a display panel module 93. Moreover, the optical lens module 92 is one of the optical lens modules 1-5, and the display panel module 93 may be a digital light processing (DLP) projector or a liquid crystal display (LCD), but the present disclosure is not limited thereto.

The electronic device 9 can be worn in front of user's eyes, and the display panel module 93 emits light towards the optical lens module 92. Then, the light may be reflected by a reflective component to be transmitted towards user's eyes for providing the user with images, as shown in FIG. 27, which is a schematic view showing the application scenario of the electronic device in FIG. 24. Moreover, FIG. 27 can also be a schematic view showing the application scenario of the electronic device 8 in FIG. 26.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens module, comprising:
   a first lens barrel;
   a first lens assembly, fixed in the first lens barrel, wherein the first lens assembly has a first optical axis and comprises at least one lens element;
   an optical folding element;
   a second lens barrel; and
   a second lens assembly, fixed in the second lens barrel, wherein the second lens assembly has a second optical axis and comprises at least one lens element, and all optical elements of the second lens assembly have no relative movement with respect to each other;
   wherein a light ray sequentially passes through the first lens assembly, the optical folding element and the second lens assembly;
   wherein the optical folding element has a reflection surface, such that the light ray is reflected into the second lens assembly after passing through the first lens assembly, and the first optical axis and the second optical axis intersect on the reflection surface;

wherein the optical folding element is fixed to each of the first lens barrel and the second lens barrel, with no direct contact between the first lens barrel and the second lens barrel;

wherein an angle between the first optical axis and the second optical axis is θ, and the following condition is satisfied:

70 [deg]≤θ≤110 [deg].

2. The optical lens module according to claim 1, wherein the first lens barrel has at least one first trimmed portion which is reduced from an outer surface of the first lens barrel towards the first optical axis, such that a contour of the first lens barrel viewed along the first optical axis is non-circular.

3. The optical lens module according to claim 2, wherein a shortest distance of an outer contour of the first lens barrel in a direction perpendicular to the first optical axis is D1, and the following condition is satisfied:

0.74 [mm]≤D1≤7.2 [mm].

4. The optical lens module according to claim 3, wherein the shortest distance of the outer contour of the first lens barrel in the direction perpendicular to the first optical axis is D1, and the following condition is satisfied:

1.2 [mm]≤D1≤4.1 [mm].

5. The optical lens module according to claim 2, wherein the first lens assembly comprises at least one non-circular lens element.

6. The optical lens module according to claim 1, wherein the second lens barrel has at least one trimmed portion which is reduced from an outer surface of the second lens barrel towards the second optical axis, such that a contour of the second lens barrel viewed along the second optical axis is non-circular.

7. The optical lens module according to claim 6, wherein a shortest distance of an outer contour of the second lens barrel in a direction perpendicular to the second optical axis is D2, and the following condition is satisfied:

3.1 [mm]≤D2≤9.5 [mm].

8. The optical lens module according to claim 6, wherein the second lens assembly comprises at least one non-circular lens element.

9. The optical lens module according to claim 1, wherein a shortest distance of an outer contour of the first lens barrel in a direction perpendicular to the first optical axis is D1, a shortest distance of an outer contour of the second lens barrel in a direction perpendicular to the second optical axis is D2, and the following condition is satisfied:

D1<D2.

10. The optical lens module according to claim 1, wherein at least one of the first lens barrel and the second lens barrel has an adhesive receiving structure.

11. An electronic device, comprising:
the optical lens module of claim 1; and
a display panel module.

12. The electronic device according to claim 11, wherein the display panel module comprises a cover and a display area, the cover has a light passage opening, the light ray enters the first lens assembly via the light passage opening, the first optical axis passes through the light passage opening, and a projection of the second lens barrel in a direction in parallel with the first optical axis is at least partially overlapped with the display area.

13. The electronic device according to claim 11, wherein a longest distance of the light passage opening along a direction perpendicular to the first optical axis is Φ, and the following condition is satisfied:

0.75 [mm]≤Φ≤3.9 [mm].

14. An optical lens module, comprising:
a first lens barrel;
a first lens assembly, fixed in the first lens barrel, wherein the first lens assembly has a first optical axis and comprises at least one lens element;
an optical folding element;
a second lens barrel; and
a second lens assembly, fixed in the second lens barrel, wherein the second lens assembly has a second optical axis and comprises at least one lens element, and all optical elements of the second lens assembly have no relative movement with respect to each other;
wherein a light ray sequentially passes through the first lens assembly, the optical folding element and the second lens assembly;
wherein the optical folding element has a reflection surface, such that the light ray is reflected into the second lens assembly after passing through the first lens assembly, and the first optical axis and the second optical axis intersect on the reflection surface;
wherein the optical folding element is fixed to each of the first lens barrel and the second lens barrel, with no direct contact between the first lens barrel and the second lens barrel;
wherein the first lens barrel has at least one first trimmed portion which is reduced from an outer surface of the first lens barrel towards the first optical axis, such that a contour of the first lens barrel viewed along the first optical axis is non-circular;
wherein the second lens barrel has a light inlet and a light outlet, the light inlet has a first central axis, the light outlet has a second central axis, an angle between the first central axis and the second central axis is α, and the following condition is satisfied:

55 [deg]≤α≤180 [deg].

15. The optical lens module according to claim 14, wherein a shortest distance of an outer contour of the first lens barrel in a direction perpendicular to the first optical axis is D1, and the following condition is satisfied:

0.74 [mm]≤D1≤7.2 [mm].

16. The optical lens module according to claim 15, wherein the shortest distance of the outer contour of the first lens barrel in the direction perpendicular to the first optical axis is D1, and the following condition is satisfied:

1.2 [mm]≤D1≤4.1 [mm].

17. The optical lens module according to claim 14, wherein the first lens assembly comprises at least one non-circular lens element.

18. The optical lens module according to claim 14, wherein the second lens barrel has at least one second trimmed portion which is reduced from an outer surface of the second lens barrel towards the second optical axis, such that a contour of the second lens barrel viewed along the second optical axis is non-circular.

19. The optical lens module according to claim 18, wherein a shortest distance of an outer contour of the second lens barrel in a direction perpendicular to the second optical axis is D2, and the following condition is satisfied:

3.1 [mm]≤D2≤9.5 [mm].

20. The optical lens module according to claim 18, wherein the second lens assembly comprises at least one non-circular lens element.

21. The optical lens module according to claim 14, wherein a shortest distance of an outer contour of the first lens barrel in a direction perpendicular to the first optical axis is D1, a shortest distance of an outer contour of the second lens barrel in a direction perpendicular to the second optical axis is D2, and the following condition is satisfied:
D1<D2.

22. The optical lens module according to claim 14, wherein at least one of the first lens barrel and the second lens barrel has an adhesive receiving structure.

23. An electronic device, comprising:
the optical lens module of claim 14; and
a display panel module.

24. The electronic device according to claim 23, wherein the display panel module comprises a cover and a display area, the cover has a light passage opening, the light ray enters the first lens assembly via the light passage opening, the first optical axis passes through the light passage opening, and a projection of the second lens barrel in a direction in parallel with the first optical axis is at least partially overlapped with the display area.

25. The electronic device according to claim 23, wherein a longest distance of the light passage opening along a direction perpendicular to the first optical axis is Φ, and the following condition is satisfied:
0.75 [mm]≤Φ≤3.9 [mm].

26. An optical lens module, comprising:
a first lens barrel;
a first lens assembly, fixed in the first lens barrel, wherein the first lens assembly has a first optical axis and comprises at least one lens element;
an optical folding element;
a second lens barrel; and
a second lens assembly, fixed in the second lens barrel, wherein the second lens assembly has a second optical axis and comprises at least one lens element, and all optical elements of the second lens assembly have no relative movement with respect to each other;
wherein a light ray sequentially passes through the first lens assembly, the optical folding element and the second lens assembly;
wherein the optical folding element has a reflection surface, such that the light ray is reflected into the second lens assembly after passing through the first lens assembly, and the first optical axis and the second optical axis intersect on the reflection surface;
wherein the optical folding element is fixed to each of the first lens barrel and the second lens barrel, with no direct contact between the first lens barrel and the second lens barrel;
wherein the first lens barrel has at least one first trimmed portion which is reduced from an outer surface of the first lens barrel towards the first optical axis, such that a contour of the first lens barrel viewed along the first optical axis is non-circular;
wherein the first lens barrel has a light inlet and a light outlet, the light inlet has a first central axis, the light outlet has a second central axis, an angle between the first central axis and the second central axis is β, and the following condition is satisfied:
55 [deg]≤β≤180 [deg].

27. The optical lens module according to claim 26, wherein a shortest distance of an outer contour of the first lens barrel in a direction perpendicular to the first optical axis is D1, and the following condition is satisfied:
0.74 [mm]≤D1≤7.2 [mm].

28. The optical lens module according to claim 27, wherein the shortest distance of the outer contour of the first lens barrel in the direction perpendicular to the first optical axis is D1, and the following condition is satisfied:
1.2 [mm]≤D1≤4.1 [mm].

29. The optical lens module according to claim 26, wherein the first lens assembly comprises at least one non-circular lens element.

30. The optical lens module according to claim 26, wherein the second lens barrel has at least one second trimmed portion which is reduced from an outer surface of the second lens barrel towards the second optical axis, such that a contour of the second lens barrel viewed along the second optical axis is non-circular.

31. The optical lens module according to claim 30, wherein a shortest distance of an outer contour of the second lens barrel in a direction perpendicular to the second optical axis is D2, and the following condition is satisfied:
3.1 [mm]≤D2≤9.5 [mm].

32. The optical lens module according to claim 30, wherein the second lens assembly comprises at least one non-circular lens element.

33. The optical lens module according to claim 26, wherein a shortest distance of an outer contour of the first lens barrel in a direction perpendicular to the first optical axis is D1, a shortest distance of an outer contour of the second lens barrel in a direction perpendicular to the second optical axis is D2, and the following condition is satisfied:
D1<D2.

34. The optical lens module according to claim 26, wherein at least one of the first lens barrel and the second lens barrel has an adhesive receiving structure.

35. An electronic device, comprising:
the optical lens module of claim 26; and
a display panel module.

36. The electronic device according to claim 35, wherein the display panel module comprises a cover and a display area, the cover has a light passage opening, the light ray enters the first lens assembly via the light passage opening, the first optical axis passes through the light passage opening, and a projection of the second lens barrel in a direction in parallel with the first optical axis is at least partially overlapped with the display area.

37. The electronic device according to claim 35, wherein a longest distance of the light passage opening along a direction perpendicular to the first optical axis is Φ, and the following condition is satisfied:
0.75 [mm]≤Φ≤3.9 [mm].

* * * * *